US011026432B2

(12) United States Patent
Brandauer et al.

(10) Patent No.: US 11,026,432 B2
(45) Date of Patent: Jun. 8, 2021

(54) AUTOMATED BREAD-MAKING SYSTEM

(71) Applicant: WILKINSON RESEARCH AND DEVELOPMENT, LLC, Charlestown (KN)

(72) Inventors: Paul W. H. Brandauer, Walla Walla, WA (US); Jesse A. Knight, Walla Walla, WA (US)

(73) Assignee: Wilkinson Research and Development, LLC, Charlestown (KN)

( * ) Notice: Subject to any disclaimer, the term of this patent is extended or adjusted under 35 U.S.C. 154(b) by 354 days.

(21) Appl. No.: 15/753,261

(22) PCT Filed: Aug. 18, 2016

(86) PCT No.: PCT/US2016/047659
§ 371 (c)(1),
(2) Date: Feb. 17, 2018

(87) PCT Pub. No.: WO2017/031383
PCT Pub. Date: Feb. 23, 2017

(65) Prior Publication Data
US 2018/0249721 A1 Sep. 6, 2018

Related U.S. Application Data

(60) Provisional application No. 62/206,843, filed on Aug. 18, 2015.

(51) Int. Cl.
*A21D 8/02* (2006.01)
*A21B 7/00* (2006.01)
(Continued)

(52) U.S. Cl.
CPC .................. *A21D 8/02* (2013.01); *A21B 1/46* (2013.01); *A21B 7/005* (2013.01); *A21C 1/003* (2013.01);
(Continued)

(58) Field of Classification Search
CPC .......... A21B 1/46; A21B 7/005; A21C 1/003; A21C 1/1425; A21C 3/04; A21C 5/006;
(Continued)

(56) References Cited

U.S. PATENT DOCUMENTS

| 2,897,772 A | 8/1959 | Hunter |
| 2,930,310 A | 3/1960 | Hans |

(Continued)

FOREIGN PATENT DOCUMENTS

| CN | 206532360 U | 9/2017 |
| CN | 208705984 U | 4/2019 |

(Continued)

*Primary Examiner* — Christopher J Besler
(74) *Attorney, Agent, or Firm* — Fortem IP LLP; Mary L. Fox

(57) ABSTRACT

An automated production system is disclosed herein. One aspect of the present technology, for example, is directed toward an automated system for the continuous production of baked bread. The system can include a priming assembly having a dry ingredients priming unit and a wet ingredients priming unit. The dry ingredients priming unit can include a vertically-oriented hopper and a screw positioned within an interior region of the hopper, wherein the first screw extends along the central longitudinal axis of the hopper and is configured to rotate about its own central longitudinal axis. The system can also include a mixing assembly, a forming assembly, an oven, and a controller. The controller can be coupled to the priming assembly and configured to adjust the amount of dry ingredients delivered from the hopper to the mixing chamber by controlling rotation of the screw.

15 Claims, 21 Drawing Sheets

(51) Int. Cl.
- *B01F 15/02* (2006.01)
- *B01F 3/18* (2006.01)
- *A21B 1/46* (2006.01)
- *A21C 1/00* (2006.01)
- *A21C 1/14* (2006.01)
- *B01F 7/02* (2006.01)
- *B01F 7/30* (2006.01)

(52) U.S. Cl.
CPC ............ *A21C 1/1425* (2013.01); *B01F 3/184* (2013.01); *B01F 7/021* (2013.01); *B01F 7/302* (2013.01); *B01F 7/305* (2013.01); *B01F 15/027* (2013.01); *B01F 15/0251* (2013.01)

(58) Field of Classification Search
CPC .. A21C 9/08; A21C 11/00; A21D 8/02; B01F 15/0251; B01F 15/027; B01F 3/184; B01F 7/021; B01F 7/302; B01F 7/305
See application file for complete search history.

(56) References Cited

U.S. PATENT DOCUMENTS

| | | | |
|---|---|---|---|
| 2,953,460 A | 9/1960 | Baker | |
| 3,385,204 A | 5/1968 | Richardson | |
| 3,882,768 A | 5/1975 | Troisi et al. | |
| 4,028,024 A | 6/1977 | Moreland | |
| 4,437,766 A * | 3/1984 | Joachim | B01F 7/305 366/287 |
| 4,514,167 A | 4/1985 | Royer | |
| 4,517,447 A | 5/1985 | Hicks | |
| 4,630,930 A | 12/1986 | Seiling | |
| 4,882,981 A | 11/1989 | Bacigalupe et al. | |
| 4,938,127 A | 7/1990 | Van | |
| 5,103,719 A | 4/1992 | Mani | |
| 5,109,758 A | 5/1992 | Voegtlin | |
| 5,309,824 A | 5/1994 | Dromgoole et al. | |
| 5,404,796 A | 4/1995 | Campbell et al. | |
| 5,458,415 A | 10/1995 | Poilane | |
| 5,479,850 A | 1/1996 | Anderson | |
| 5,538,414 A | 7/1996 | Kobayashi et al. | |
| 5,605,708 A | 2/1997 | Cummins et al. | |
| 6,065,392 A | 5/2000 | Florindez | |
| 6,361,307 B1 | 3/2002 | Bernhard et al. | |
| 6,450,086 B1 | 9/2002 | Martinez | |
| 8,091,471 B2 | 1/2012 | Larsen | |
| 8,827,068 B2 | 9/2014 | Weiss | |
| 9,538,766 B2 | 1/2017 | Weiss | |
| 2001/0038876 A1 | 11/2001 | Anderson | |
| 2005/0189364 A1 | 9/2005 | Herzog et al. | |
| 2006/0120212 A1 | 6/2006 | Taniguchi et al. | |
| 2008/0163762 A1 | 7/2008 | Weiss | |
| 2008/0181992 A1 | 7/2008 | Willett | |
| 2011/0070342 A1 | 3/2011 | Wilkens | |
| 2011/0129577 A1 | 6/2011 | De et al. | |
| 2013/0224355 A1 * | 8/2013 | Bernhardt | A21C 9/08 426/501 |

FOREIGN PATENT DOCUMENTS

| | | |
|---|---|---|
| FR | 2515001 A1 | 4/1983 |
| KR | 20120097586 A | 9/2012 |
| WO | WO1988009614 A1 | 12/1988 |
| WO | WO2006113446 A1 | 10/2006 |
| WO | 2010049648 A1 | 5/2010 |
| WO | 2017031383 A1 | 2/2017 |
| WO | 2018042463 A1 | 3/2018 |

* cited by examiner

AUTOMATED BREAD-MAKING SYSTEM

CROSS-REFERENCE TO RELATED APPLICATIONS

The present application is a 371 of International Patent Application No. PCT/US16/47659, filed Aug. 18, 2016, which claims benefit of priority to U.S. Provisional Application No. 62/206,843, filed Aug. 18, 2015, both of which are incorporated herein by reference in their entireties.

TECHNICAL FIELD

Embodiments of the present technology are directed to automated production systems and associated processes, and, more particularly, to an automated bread making system and associated processes.

BACKGROUND

Bread making machines and equipment range in size from small household appliances limited to producing a few loaves of bread at a time to massive automated systems for the continuous production of baked bread on an industrial scale. The latter are suited for the service of wholesale markets and have a capacity which is far beyond the demands of any single retail outlet. Conversely, the capacity of household appliances falls far short of such demands. Thus, retailers who want to offer fresh baked bread for sale normally will do so using conventional commercial dough mixing machines, baking machines, proofing chambers, and other equipment. Each piece of equipment often stands alone from the others. Collectively, the equipment can have a relatively large "footprint" occupying a significant amount of floor space. Additionally, the process of making bread using such equipment can be relatively labor intensive and require manual intervention as the product is moved from one stage of production to the next. Consequently, the cost of production is increased. Accordingly, there is a need for an improved integrated system and components which enable the automated continuous production of baked products.

BRIEF DESCRIPTION OF THE DRAWINGS

In FIG. 2F, the top and bottom covers 291, 292 are shown in the open position for ease of illustration. In FIG. 2G, the top and bottom covers 291, 292 are shown in the closed position for ease of illustration.

DETAILED DESCRIPTION

Figure 1A:
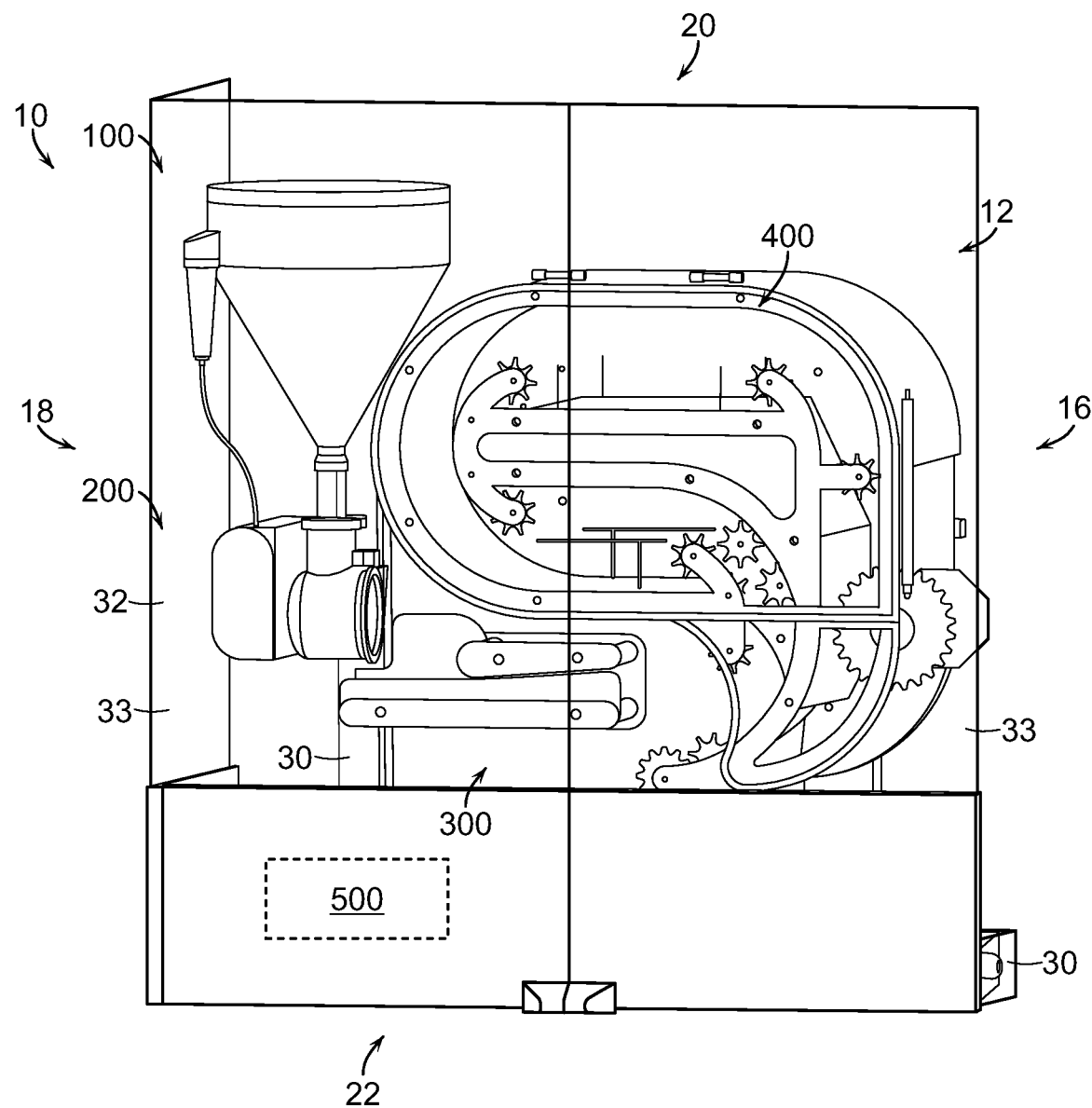
FIG. 1A is a front isometric view of an automated production system configured in accordance with one or more embodiments of the present technology. Various portions of the system have been removed or made transparent for ease of illustration.

An automated production system 10 (also referred to herein as the "system 10"), in accordance with embodiments of the present disclosure is shown in the drawings for purposes of illustration. In the following description, numerous specific details are discussed to provide a thorough and enabling description for embodiments of the disclosure. One skilled in the relevant art, however, will recognize that the disclosure can be practiced without one or more of the specific details. In other instances, well-known structure or operations are not shown, or are not described in detail, to avoid obscuring aspects of the disclosure. In general, alternative and alternate embodiments described herein are substantially similar to the previously described embodiments, and common elements are identified by the same reference numbers. Moreover, while the description provided herein for illustrative purposes involves systems, components and methods for continuous baking of bread, it is to be understood that embodiments of the system, components, and methods can be used for the production of other goods or products.

I. OVERVIEW

Figure 1B:
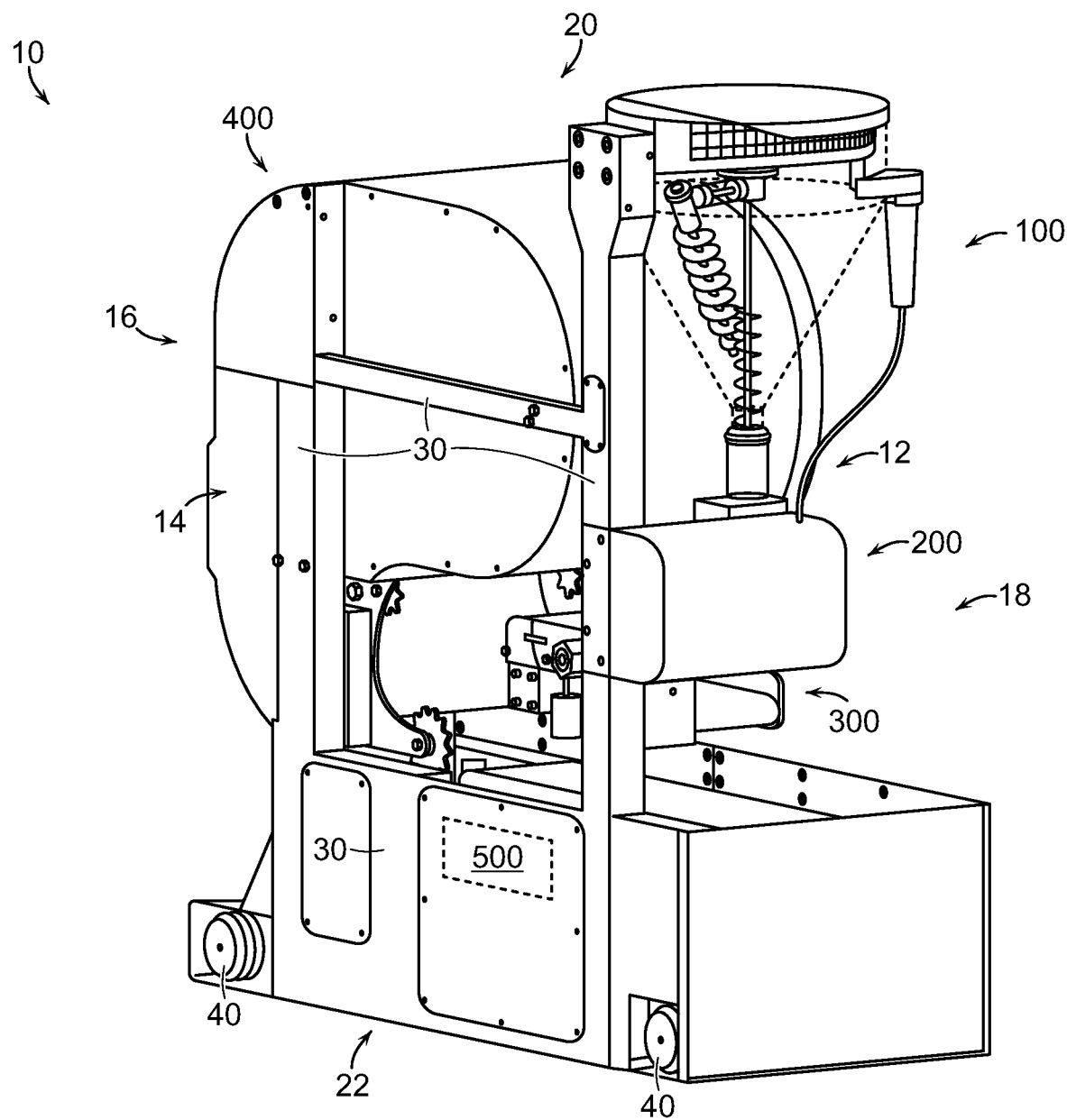
FIG. 1B is a rear isometric view of the automated production system shown in FIG. 1A.

FIGS. 1A and 1B are front and rear views of the automated production system 10, respectively, in accordance with one or more embodiments of the present technology. As identified below, portions of the system 10 may not be fully shown or made transparent in FIGS. 1A and 1B for purposes of illustration. Referring to FIGS. 1A and 1B together, the illustrated system 10 includes a priming assembly 100, a mixing assembly 200, a forming assembly 300, and an oven 400 (referred to collectively herein as "the assemblies 11"). The assemblies 11 are supported or otherwise coupled to a frame 30. The system 10 can further include a controller 500 (shown schematically in FIGS. 1A and 1B) having memory and processing circuitry and coupled to one or more of the assemblies 11 and/or one or more components of the assemblies 11. As described in greater detail below, the system 10 is configured to automatically and continuously move production ingredients (e.g., wet and dry ingredients) sequentially through the priming assembly 100, mixing assembly 200, forming assembly 300 and oven 400, to produce a baked product (e.g., bread). The priming assembly 100 receives, mixes, and/or measures the ingredients separately before delivering the wet and dry ingredients to the mixing assembly 200. The mixing assembly 200 mixes the wet and dry ingredients together to form a lump of dough, and delivers the lump of dough to the forming assembly 300. The forming assembly 300 shapes the lump of dough in preparation for baking, then delivers the shaped lump of dough to the oven 400 where the shaped lump of dough is baked into the final baked product (e.g., a loaf of bread).

In the embodiment shown in FIGS. 1A and 1B, the system 10 has a front portion 12, a rear portion 14 (FIG. 1B), a right portion 16, a left portion 18, a top portion 20, and a bottom portion 22. The frame 30 and assemblies 11 are sized and arranged such that the system 10 is configured to be positioned within a retail outlet, such as a store, a supermarket, a retail bakery or other selected location where there is a demand for fresh baked product, but not on an industrial scale as in the case of wholesale bakeries. For example, the outermost dimensions of the system 10 (in length×width×height) is between about 5 feet×2 feet×7 feet and about 6 feet×3 feet×7 feet. The smaller size of the system 10 provides several advantages over conventional, industrial-sized production systems, such as lower cost, less weight, easier to move, and easier maintenance. Additionally, the small footprint of the system 10 requires less floor space in the retail outlet, and thus reduces any potential loss to the retail outlet in advertising and/or product display space.

II. SELECTED EMBODIMENTS OF ASSEMBLIES FOR USE WITH THE SYSTEMS OF THE PRESENT TECHNOLOGY

Figure 2A:
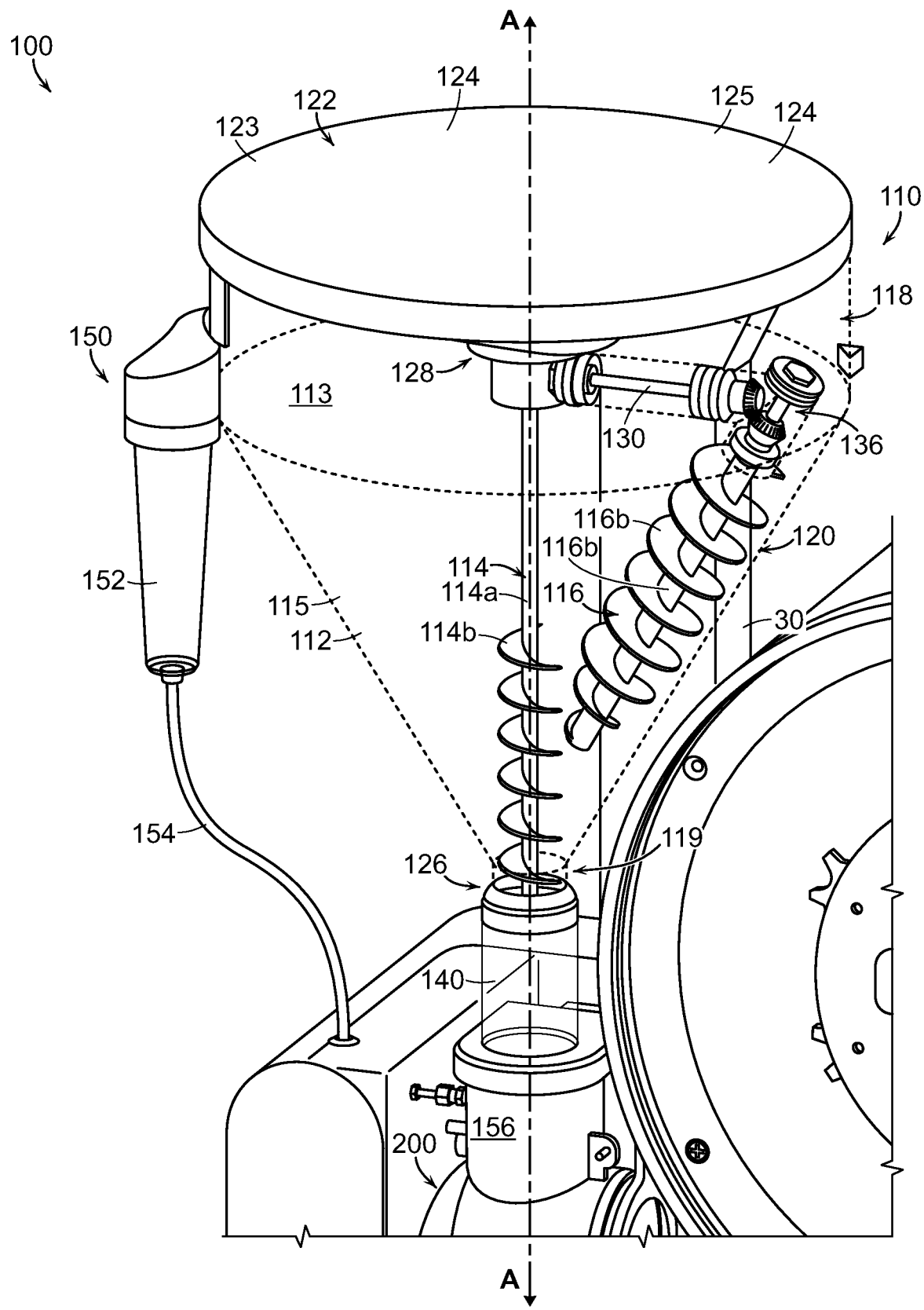
FIG. 2A is an enlarged, front isometric view of a portion of the system, including the priming assembly, configured in accordance with an embodiment of the present technology.

FIG. 2A is an enlarged, front isometric view of the priming assembly 100 configured in accordance with an embodiment of the present technology. The priming assembly 100 includes a dry ingredients priming unit 110 and a wet ingredients priming unit 150.

Figure 2B:
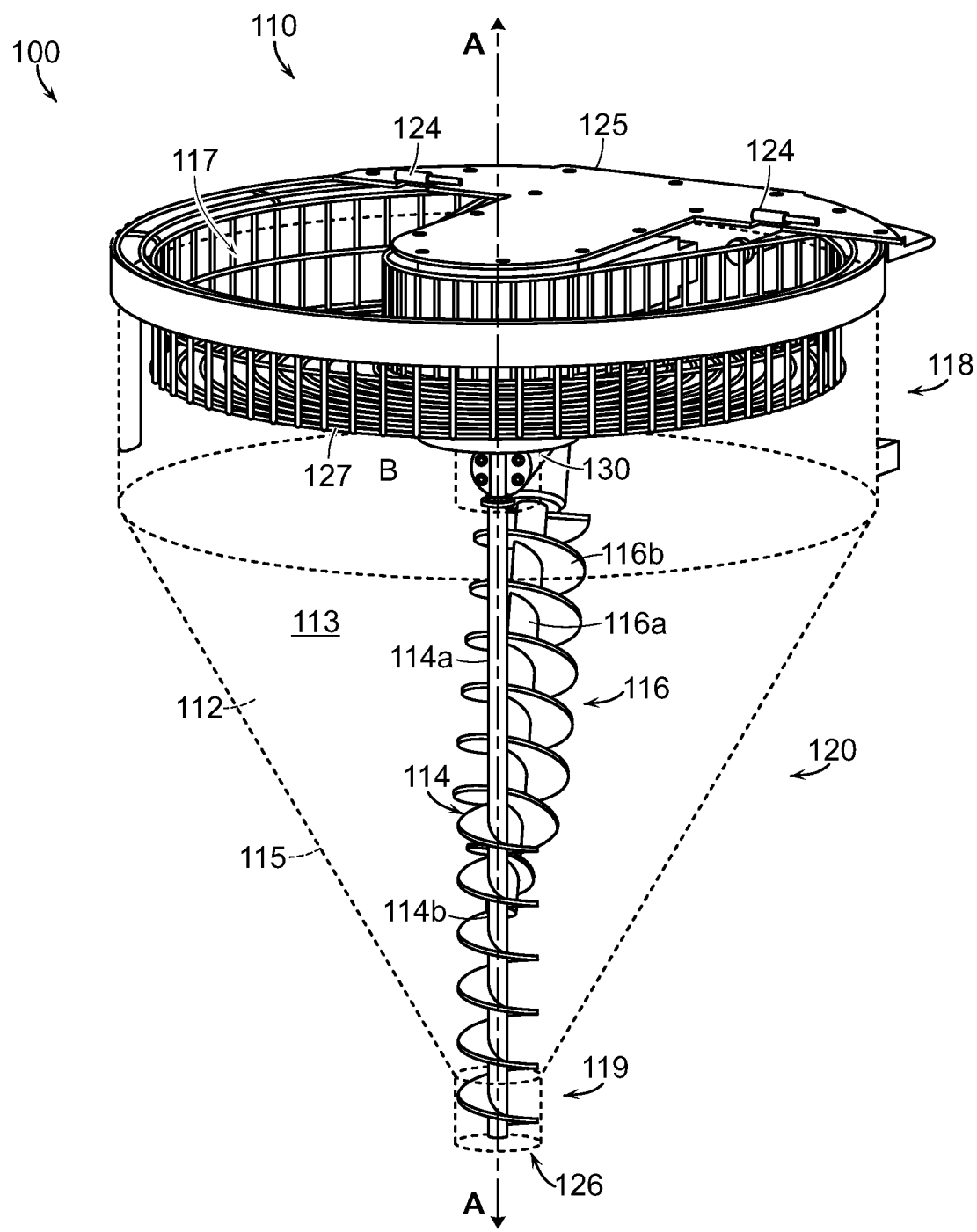
FIG. 2B is an isometric view of the hopper shown in FIG. 2A. The cover has been removed for ease of explanation.

The dry ingredients priming unit 110 of the illustrated embodiment (shown in FIGS. 1A, 1B, and 2A) comprises a vertically-oriented hopper 112 coupled to a drive system 128 and first and second screws 114, 116. FIG. 2B is an isolated isometric view of the hopper 112 shown in FIG. 2A with the cover 122 removed for purposes of illustration. As shown in FIG. 2A, the hopper 112 has a first cylindrical portion 118, a conical portion 120 that tapers downwardly away from the first cylindrical portion 118, and a second cylindrical portion 119 extending downwardly away from the conical portion 120. The diameter of the second cylindrical portion is much smaller than the diameter of the first cylindrical portion. In other embodiments, the hopper 112 can have other suitable shapes and/or configurations (e.g., comprised of only a conical portion, includes a frustoconical portion, includes more or less than two cylindrical portions, etc.) The cylindrical portion 118 and the conical portion 120 together comprise a hopper sidewall 115 that defines an interior region 113 of the hopper 112. (The sidewall 115 is shown as transparent in FIGS. 2A-2B for ease of describing components positioned within the hopper 112.)

In in the illustrated embodiment, the hopper 112 includes an opening 117 at its top end and a cover 122 (removed in FIG. 2B) extending across the opening 117 and movable between an open position and a closed position. When the cover 122 is in the open position, the opening 117 provides an inlet for receiving one or more dry ingredients (e.g., flour, sugar, salt, yeast, spices, milk powder, and/or fruit powders) from one or more external sources. The cover 122 has a first portion 123 pivotable about hinges 124 and a second portion 125 fixed across a top end of the hopper 112. In some embodiments, a bottom surface of the first and/or second portions 123, 125 can include a reflective surface (e.g., a mirror). Accordingly, when the first portion 123 of the hopper 112 is in the open position or an intermediate position between the open and closed positions, a user can use the mirror to see into the hopper 112. Although the cover 122 is shown having the partial-circle shape, in other embodiments the cover 122 can have other shapes or sizes (e.g., a full circle, non-circular, etc.). Likewise, in other embodiments the entire cover 122 can be movable.

As best shown in FIG. 2B, in some embodiments a top portion of the hopper 112 can include a mesh 127. At least a portion of the mesh 127 can be positioned between the opening 117 and the interior region 113 of the hopper 112. The mesh 127 can act as a screen to filter contents about to enter the hopper 112. The mesh 127 can also block users from inadvertent access to the first and/or second screws 114, 116.

In some embodiments, the system 10, priming assembly 100, and/or dry ingredients priming unit 110 include one or more dry ingredients sources. For example, in some embodiments, the system 10 can include one or more containers configured to house one or more dry ingredients. The containers can be fixed to the frame 30 (or other component of the system 10) and/or operably coupled to the dry ingredients priming unit 110 via tubing and/or one or more valves. In such embodiments, the controller 500 can be coupled to the valves to automatically control the timing, amount, and/or composition of ingredients dispensed into the hopper 112 from the container(s). In other embodiments, the dry ingredients can be manually dispensed into the hopper 112 from the external source(s).

The hopper 112 also includes an outlet 126 at its bottom end that discharges the dry ingredients from the hopper 112 into the mixing assembly 200. In some embodiments, including the embodiment shown in FIG. 2A, the dry ingredients priming unit 110 can include an intermediate chamber 140 positioned between the hopper 112 and the mixing assembly 200. The chamber 140 can have a top or inlet portion operably coupled to the hopper outlet 126 (not visible in FIG. 2A), and a bottom or outlet portion fluidly coupled to the mixing assembly 200 via a movable door or valve (not visible in FIG. 2A). The chamber 140 and associated first and second valves provide additional separation and sealing between the hopper 112 and the mixing assembly 200, thereby protecting the contents of the hopper 112 from the moisture that may be present in the mixing assembly 200. The illustrated chamber 140 is transparent so that a user can view an interior region of the chamber 140. For example, it may be advantageous to have such visualization should any blockage occur. In the illustrated embodiment, the outlet 126 of the hopper 112 is directly coupled to the inlet of the chamber 140. In other embodiments, the hopper 112 and/or chamber 140 can include a valve between the outlet 126 and the chamber 140. In other embodiments, the dry ingredients priming unit 110 does not include an intermediate chamber 140 and the hopper 112 is directly coupled to the mixing assembly 200, for example, via a valve.

Upon receiving a desired quantity of one or more dry ingredients within the interior region 113 of the hopper 112, the drive system 128 can be manually or automatically activated (e.g., by the controller 500) to move one or both of the first and second screws 114, 116 within the interior region 113, thereby agitating and mixing the dry ingredients before ultimately dispensing a metered volume of the dry ingredients to the mixing assembly 200, as described in greater detail below.

Figure 2C:
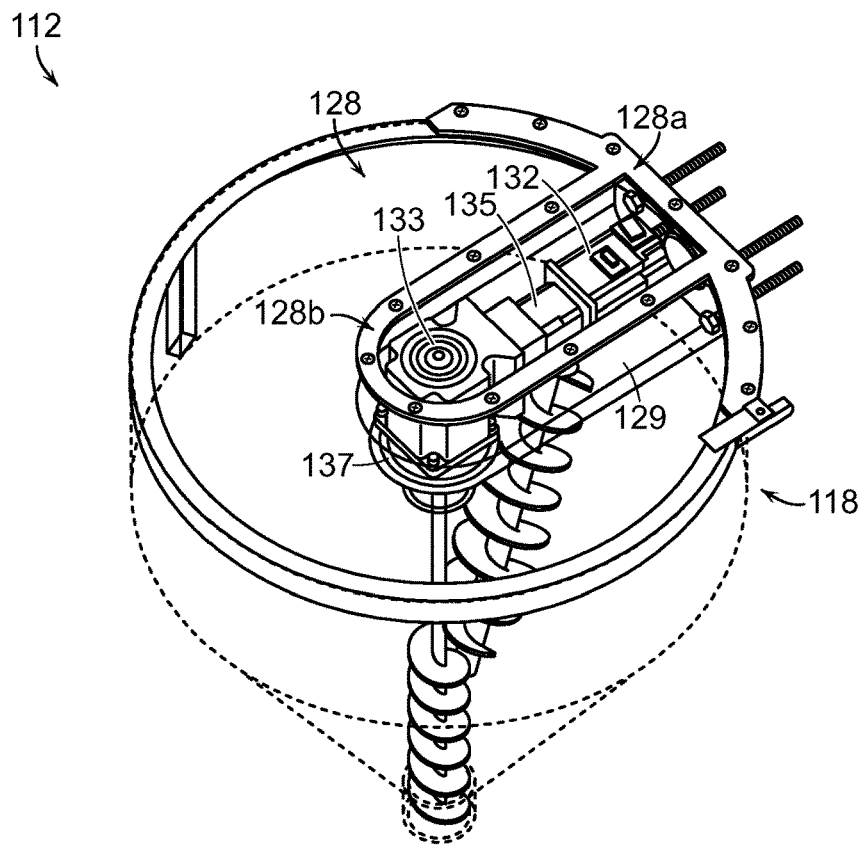
FIG. 2C is a top, isometric, isolated view of the hopper shown in FIG. 2A. Portions of the hopper have been removed for ease of explanation.

FIG. 2C is a top isometric view of the hopper 112 with portions removed to show the drive system 128. As shown in FIG. 2C, a top portion of the hopper 112 includes a support member 129 that contains at least a portion of the drive system 128. The support member 129 is coupled to or integral with the sidewall of the first cylindrical portion 118 and extends radially into the interior portion 113 of the hopper 112. The drive system 128 sits in the support member 129 and extends between a proximal portion 128a disposed at the sidewall and a distal portion 128b disposed at a central axis portion of the hopper 112. The illustrated drive system 128 includes a servo motor 132, a right angle gear box 133, and a coupling 135 positioned between and electrically and/or mechanically coupling the servo motor 132 and the right angle gear box 133. The drive system 128 also includes a harmonic drive 137 coupled to a bottom portion of the right angle gear box 133. Although the drive system 128 is shown including a single motor, in other embodiments the drive system 128 can include more than one motor (e.g., two motors, three motors, etc.) and/or additional components (e.g., a clutch). For example, in some embodiments the drive system 128 can include a first motor coupled to the first screw 114 and a second motor coupled to the second screw 116.

Figure 2D:
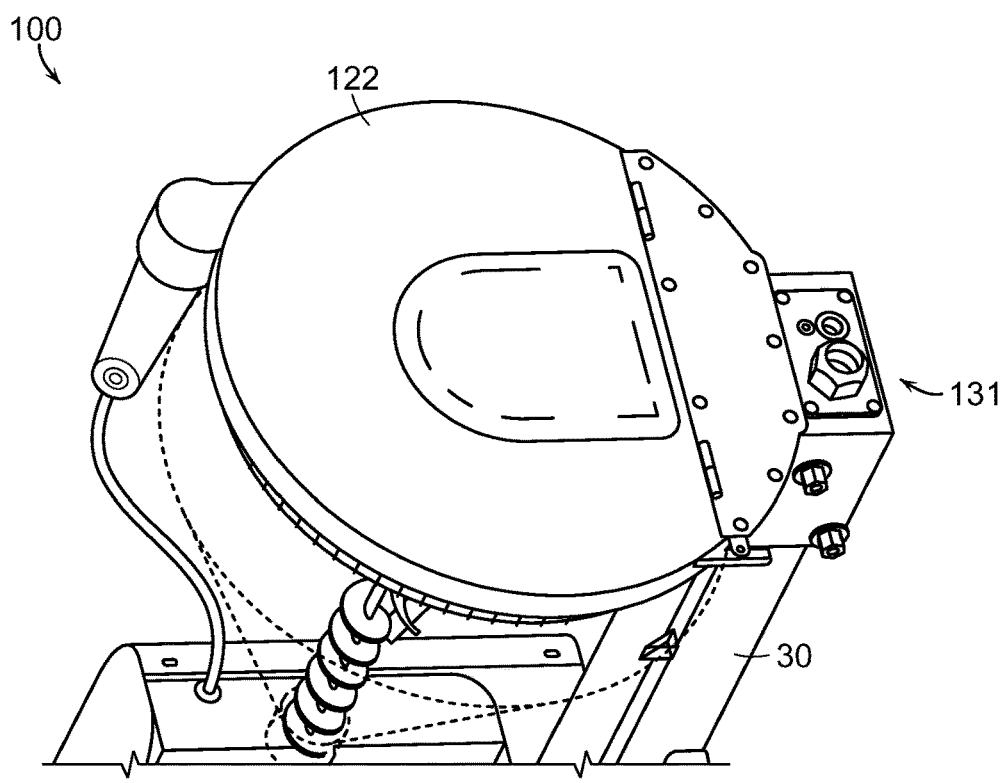
FIG. 2D is a top, isometric view of a portion of the dry ingredients priming unit shown in FIG. 2A.

As shown in the top isometric view of the hopper 112 in FIG. 2D, the priming system 100 further includes a control member 131 supported by the frame 30 and positioned adjacent the sidewall. The control member 131 is in direct (e.g., wired) and/or wireless (e.g., WiFi, RFID, Bluetooth, etc.) communication with the controller 500. The control member 131 is electrically and/or mechanically coupled to the proximal portion 128a of the drive system 128 and configured to activate and/or deactivate the drive system 128 to move the first and/or second screws 114, 116 based on the desired function of the hopper 112.

In the illustrated embodiment, the first screw 114 is positioned within the interior of the hopper 112 along the hopper's central vertical axis A. The first screw 114 comprises an elongated shaft 114a and a ribbon 114b wrapped helically along the longitudinal axis of the shaft 114a. The ribbon 114b extends radially outwardly from the shaft 114a, and the edge of the ribbon 114b radially furthest from the shaft 114a can be sharp or blunt, depending on the ingredients to be mixed. A top end of the first screw 114 is coupled to the drive system 128 and a bottom end of the first screw 114 is aligned with or adjacent to the hopper outlet 126. When the drive system 128 is activated, the first screw 114 is configured to rotate about its own central longitudinal axis. At least one full turn of the ribbon 114b resides within an interior region of the second cylindrical portion 119 of the hopper 112 and is sized such that the outermost edge of the ribbon 114b along the turn extends across the diameter of the second cylindrical portion 119 and, depending on the orientation of the shaft 114a, prevents dry ingredients in the hopper 112 from entering the chamber 140. During the dry ingredients mixing stage of production, the first screw 114 rotates in a first direction (clockwise or counterclockwise) such that the ribbon 114b moves the dry ingredients in an upward direction away from the outlet 126, thereby mixing the upward-moving dry ingredients with the dry ingredients gravitating downwards.

Once the dry ingredients have been thoroughly mixed, the controller 500 (FIG. 1A) triggers the drive system 128 to reverse the rotation of the first screw 114 in a second direction (the other of clockwise or counterclockwise) such that the ribbon 114b pushes the ingredients downward into the chamber 140. Each turn of the first screw 114 releases a set volume of dry ingredients into the chamber 140. Accordingly, the controller 500 (FIG. 1A) of the present technology includes one or more algorithms that causes the drive system 128 to selectively rotate the first screw 114 based on the volume of dry ingredients desired to be released into the chamber 140. For example, it may require three turns of the first screw 114 to release a volume of dry ingredients required for a small loaf of bread, while it may require six turns of the first screw 114 to release a volume of dry ingredients required for a large loaf of bread. Once the metered volume of dry ingredients is received by the chamber 140, the controller 500 (FIG. 1A) opens the valve between the chamber 140 and the mixing assembly 200, thereby discharging the predetermined volume of dry ingredients from the chamber 140 into the mixing assembly 200. After discharging the dry ingredients, the controller 500 closes the valve to prevent moisture from the mixing assembly 200 to enter the chamber 140 and/or the hopper 112.

Referring still to FIG. 2A, the second screw 116 of the dry ingredients priming unit 110 is also positioned within the interior region 113 of the hopper 112. The second screw 116 is positioned adjacent the sidewall of the conical portion 120, and extends parallel to the sidewall of the conical portion 120. As such, the central longitudinal axis of the second screw 116 forms an angle with the central longitudinal axis of the first screw 114. In some embodiments, the angle can be between about 15 degrees and about 60 degrees (e.g., between about 30 degrees and about 50 degrees). The second screw 116 includes an elongated shaft 116a and a ribbon 116b wrapped helically along a longitudinal dimension of the shaft 116a. The ribbon 116b extends radially outwardly from the shaft 116a, and the edge of the ribbon 116b radially furthest from the shaft 116a can be sharp or blunt, depending on the ingredients to be mixed.

Figure 2E:
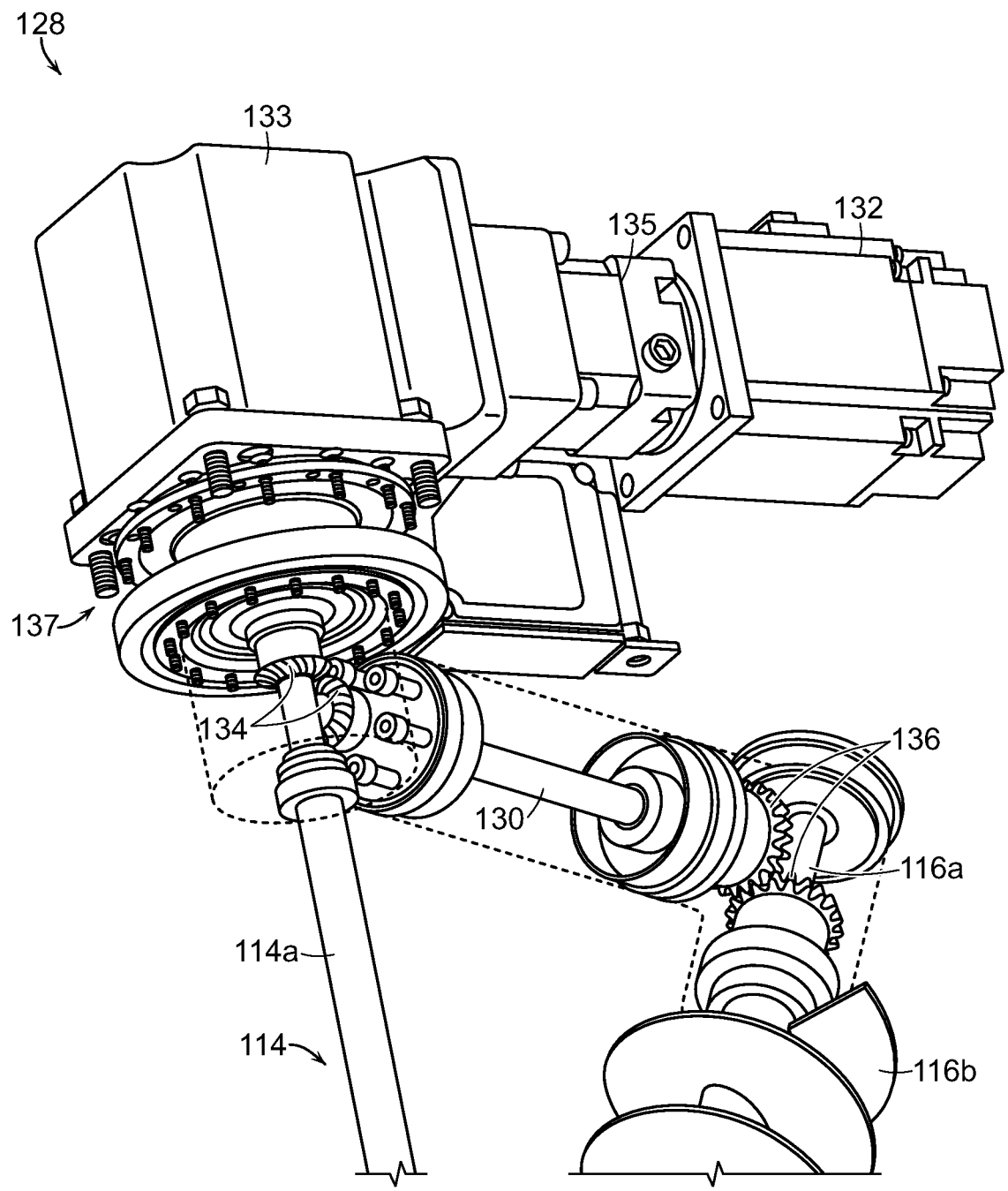
FIG. 2E is an isolated, enlarged isometric view of a portion of the dry ingredients priming unit shown in FIG. 2A.

As best shown in the isolated view of the drive system 128 in FIG. 2E, the first and second screws 114, 116 are mechanically coupled by a first gear assembly 134, a drive shaft 130, and a second gear assembly 136. The first gear assembly 134 mechanically couples the drive system 128 to the drive shaft 130 and the shaft 114a of the first screw 114. The drive shaft 130 extends radially outwardly from the central longitudinal axis of the first screw 114 such that the central longitudinal axis of the drive shaft 130 forms a 90 degree angle with the central longitudinal axis of the first screw 114. In other embodiments, the drive shaft 130 can extend at other suitable angles relative to the central longitudinal axis of the first screw 114. A distal portion of the drive shaft 130 is coupled to the second gear assembly 136, which is also coupled to a top portion of the elongated shaft 116a of the second screw 116. As such, the second gear assembly 136 couples the drive shaft 130 to the second screw 116.

In operation, activation of the first gear assembly 134 causes rotation of the first screw 114 around its own central longitudinal axis, and also causes rotation of the drive shaft 130 about its own central longitudinal axis as well as about the central longitudinal axis of the first screw 114. Rotation of the drive shaft 130 about its own central longitudinal axis activates the second gear assembly 136, which causes rotation of the second gear assembly 136 about its own central longitudinal axis. Rotation of the drive shaft 130 about the central longitudinal axis of the first screw 114 causes rotation of the second screw 116 about the central longitudinal axis of the first screw 114 such that the second screw 116 rotates around the periphery of the interior region 113 of the hopper 112 (indicated by arrow B in FIG. 2A) parallel to the conical portion 118 of the hopper 112. Accordingly, during the dry ingredients mixing stage of production, the second screw 116 simultaneously: (1) moves the dry ingredients in an upward direction via the rotating ribbon 116b, thereby mixing the upward-moving dry ingredients with the dry ingredients gravitating downwards, and (2) rotates around the sidewall of the hopper 112, thereby removing dry ingredients from the sidewall 115 (FIG. 2A) and deflecting such ingredients into a more central portion of the hopper 112.

Depending on the condition of the dry ingredients within the hopper 112 and/or recipe requirements, the second gear assembly 136 and/or drive shaft 130 can be decoupled from the first gear assembly 134 such that movement of the first screw 114 can be independent of movement of the second screw 116. Such decoupling can be manual or automatic via the controller 500 (FIG. 1A) based on a preset program and/or feedback from one or more sensors positioned within the hopper 112. For example, if the dry ingredients are particularly uncompressed or sparse, the second screw 116 can rotate about its own longitudinal axis and/or the central longitudinal axis of the hopper 112 in a direction such that the ribbon 116b pushes the ingredients downward toward the outlet 126 of the hopper 112 while the first screw 114 dispenses the dry ingredients to the mixing assembly 200. If the dry ingredients are particularly dense and/or are clogging a bottom portion of the hopper 112, the second screw 116 can rotate about its own longitudinal axis and/or the central longitudinal axis of the hopper 112 in a direction such that the ribbon 116b lifts the ingredients upward and away from the bottom portion. In a particular embodiment, the second screw 116 can rotate around the hopper 112 but not around its own central longitudinal axis. In yet another embodiment, the second screw 116 can cease all rotation and remain relatively stationary while the first screw 114 dispenses the dry ingredients.

Additionally, the first and second screws 114, 116 can rotate at the same or different rates. For example, in some embodiments, the first screw 114 can rotate at about 1 rpm to about 3 rpm (e.g., 2 rpm) about its own central longitudinal axis while the second screw 116 can rotate at about 1 rpm to about 3 rpm (e.g., 2 rpm) about its own central longitudinal axis and about 50 rpm to about 150 rpm (e.g., 100 rpm) about the central longitudinal axis of the hopper 112. In other embodiments, the first and second screws 114, 116 can rotate at other suitable speeds.

Figure 2F:
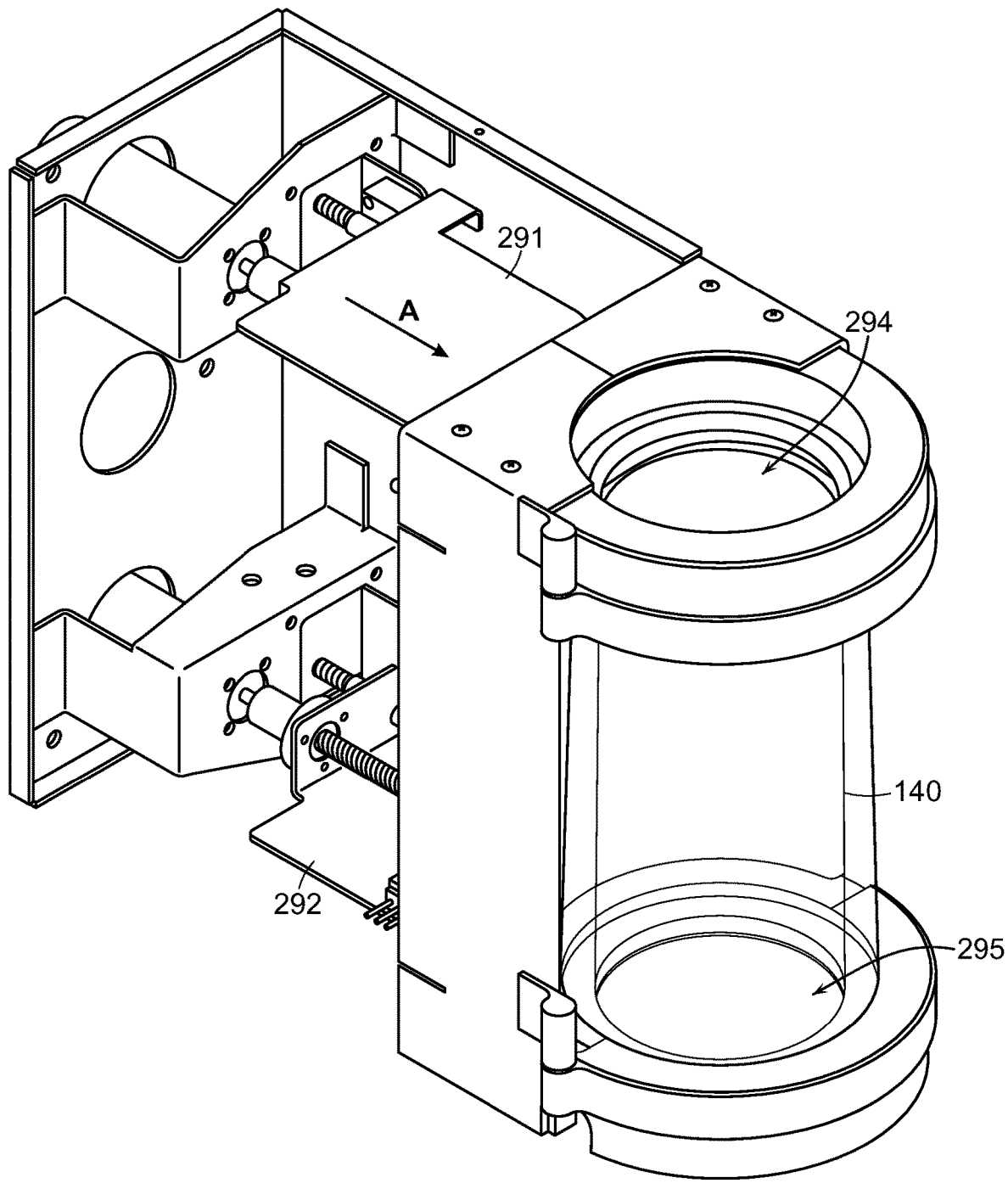
FIGS. 2F and 2G are isometric and top views, respectively, of a metering device configured in accordance with one or more embodiments of the automated production systems of the present technology.
Figure 2G:
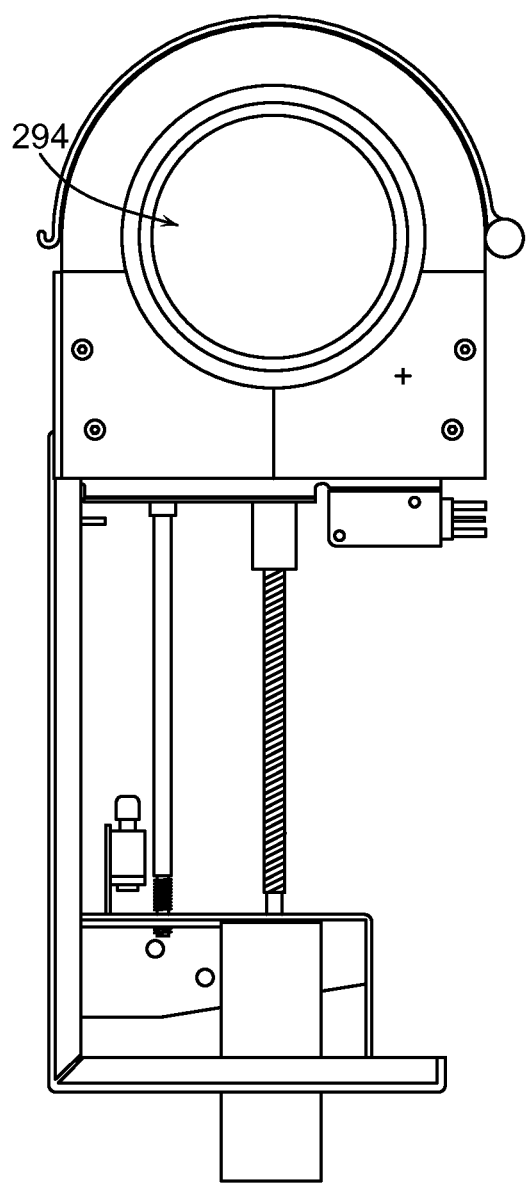

In some embodiments of the system 10, the dry ingredients priming unit 110 includes only the first screw 114 or only the second screw 116. For example, in a particular embodiment, the dry ingredients priming unit includes the second screw 116 for mixing an does not include the first screw 114. In such embodiments, the hopper 112 can include a cover, valve, hatch, movable door or other ingredients regulation means at the outlet 126, and the chamber 140 can be configured to hold a selected volume of dry ingredients. In such embodiments, such as that shown in FIGS. 2F and 2G, during operation, the top cover 291 moves away from the top opening 294, thereby allowing the chamber 140 to fill with dry ingredients through opening 294. Filling of the chamber 140 continues until a sensor within the chamber 140 senses the chamber 140 has been filled to capacity predetermined amount, at which point the top cover 291 closes (as indicated by arrow A) and dry ingredients are no longer dispensed into the chamber 140. Then the bottom cover 295 opens to dispense the metered volume of dry ingredients into the mixing chamber. In FIG. 2F, the top and bottom covers 291, 292 are shown in the open position for ease of illustration. In FIG. 2G, the top and bottom covers 291, 292 are shown in the closed position for ease of illustration. In some embodiments, the priming unit can be configured to receive multiple chambers, each configured to hold a different volume. In yet other embodiments, the chambers can be on a rotating table. The desired chamber can be manually or automatically rotated into alignment with the hopper outlet 126 and the mixing chamber inlet. In yet other embodiments, the hopper 112 does not contain any screws.

Referring back to FIG. 2A, the wet ingredients priming unit 150 includes a liquid reservoir 152 coupled to the mixing assembly 200 via tubing 154. The liquid reservoir is coupled to the hopper 112. The tubing 154 has an outlet at the mixing assembly 200. The wet ingredients priming unit 150 can be coupled to the controller 500 and is configured to deliver a predetermined amount of wet ingredients to the mixing assembly 200. Suitable wet ingredient priming units for use with the system of the present technology are disclosed in U.S. Pat. No. 8,091,471, which is incorporated herein by reference in its entirety.

Referring back to FIGS. 1A and 1B, the mixing assembly 200 is configured to separately receive dry and wet ingredients from the dry ingredients priming unit 110 and wet ingredients priming unit 150, respectively, and mix the wet and dry ingredients to form a lump of dough. The mixing assembly 200 is a conventional mixing assembly, although in some embodiments other mixing assemblies could be used. The mixing assembly 200 then delivers the lump of dough to the forming assembly 300.

Figure 3A:
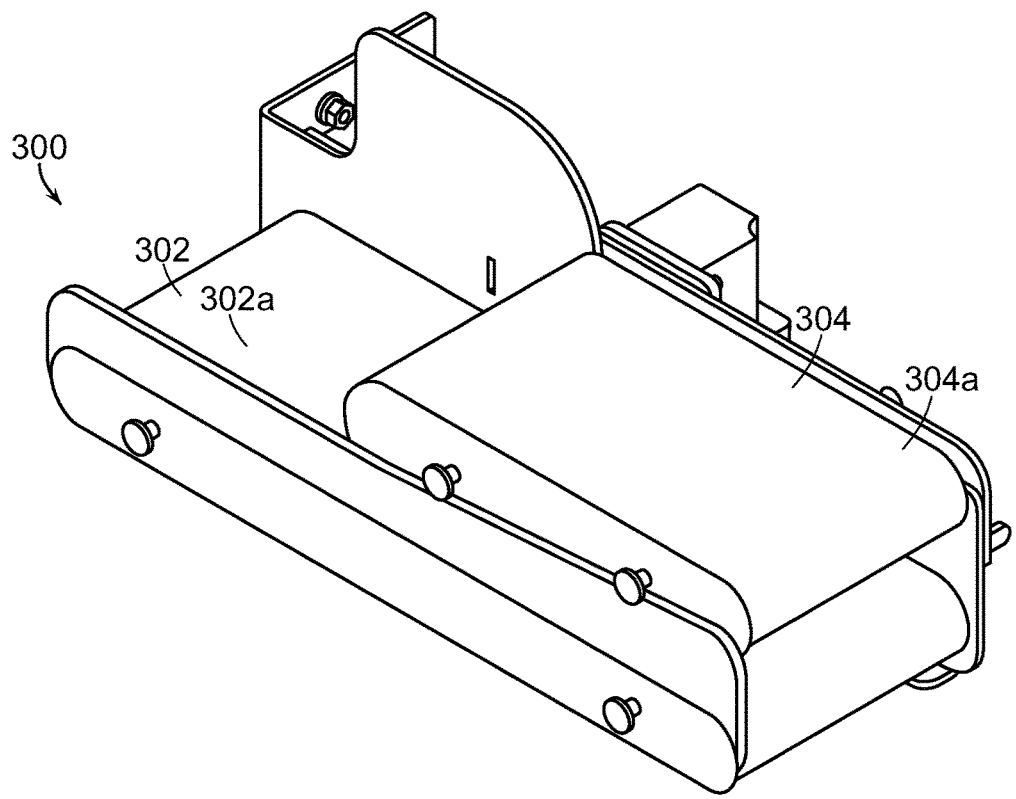
FIG. 3A is an isolated, top isometric view of a forming assembly configured in accordance with one or more embodiments of the present technology.
Figure 3B:
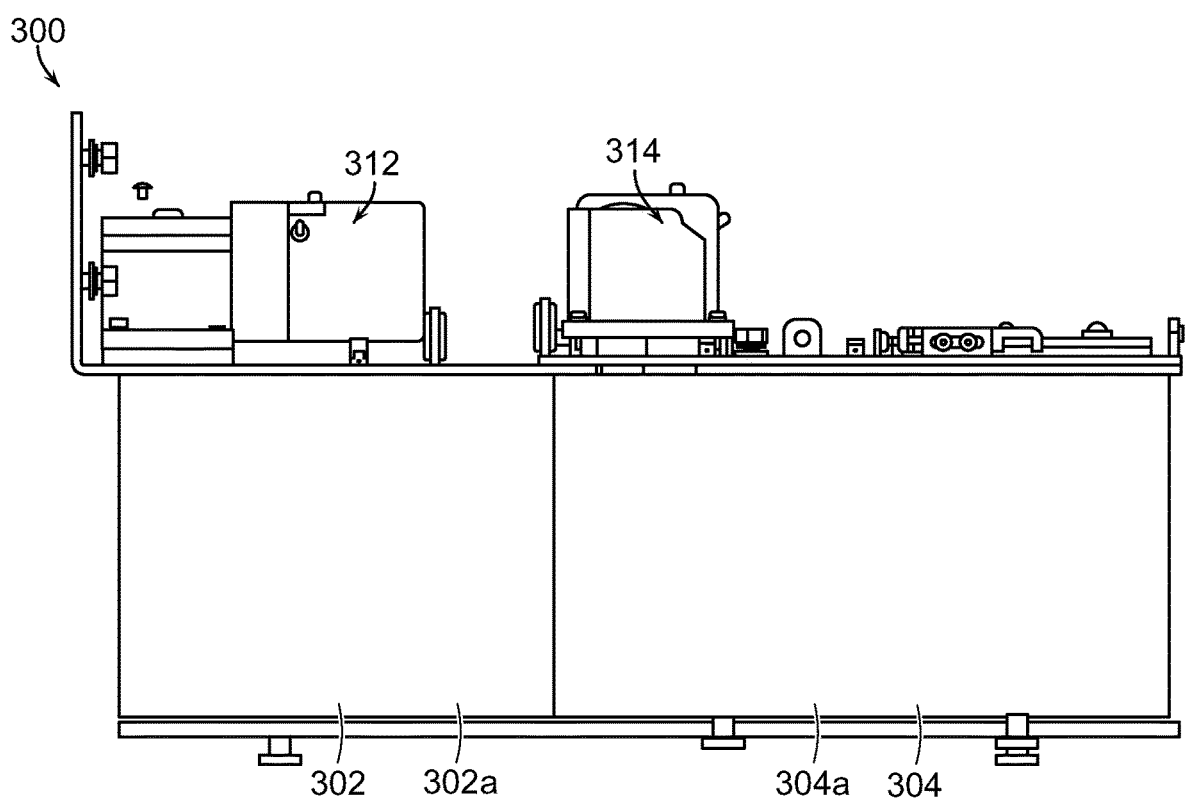
FIG. 3B is a top view of the forming assembly shown in FIG. 3A.
Figure 3C:
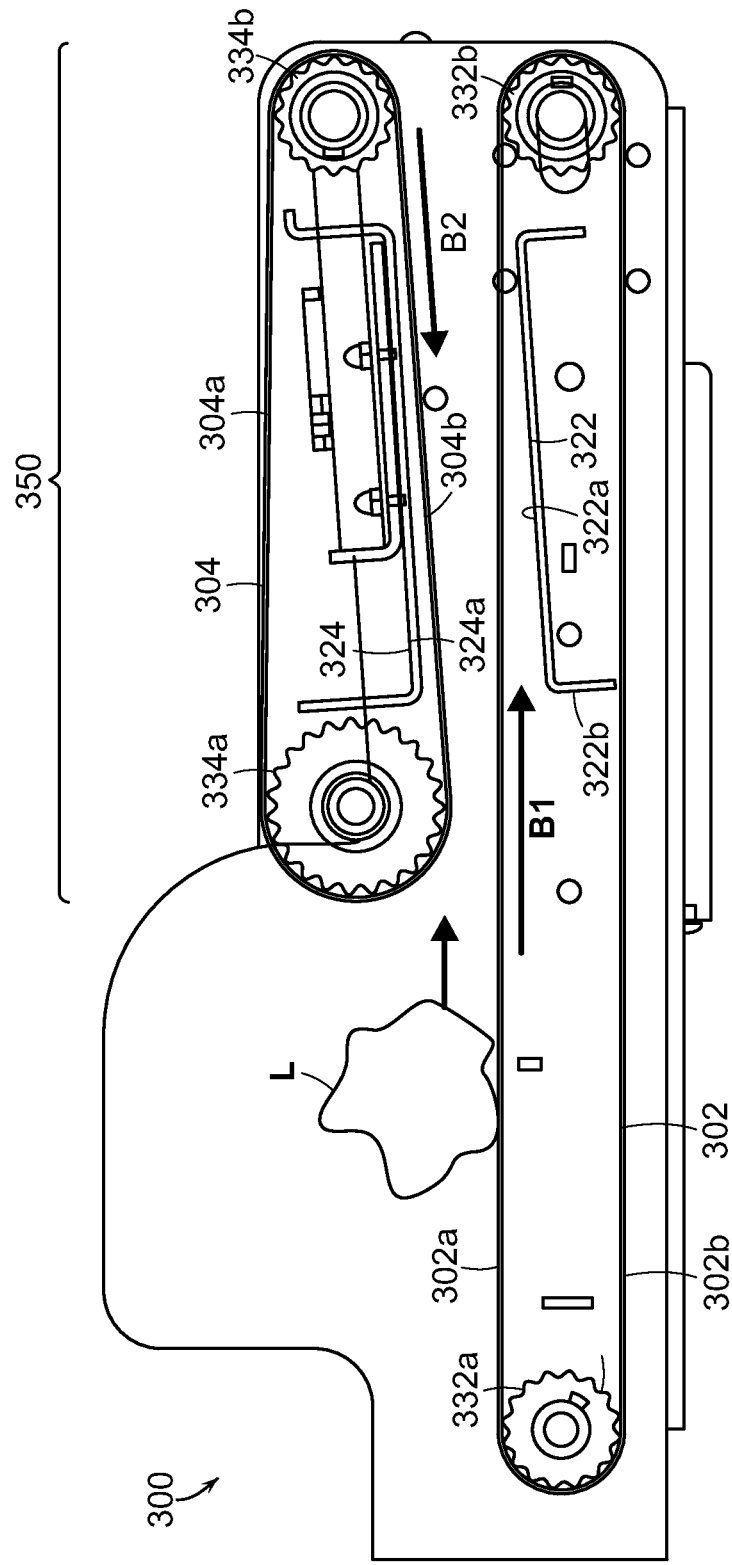
FIG. 3C is a side cross-sectional view of the forming assembly shown in FIG. 3A.

FIG. 3A is an isolated, top isometric view of an adjustable forming assembly 300 configured in accordance with one or more embodiments of the present technology. FIG. 3B is a top view of the forming assembly 300 shown in FIG. 3A, and FIG. 3C is a side cross-sectional view of the forming assembly shown in FIG. 3A. Referring to FIGS. 3A-3C together, the forming assembly 300 includes a flexible conveyor belt 302 positioned around proximal and distal conveying pulleys 332a, 332b, respectively, and a flexible forming belt 304 positioned around proximal and distal forming pulleys 334a, 334b, respectively. The forming belt 304 is positioned above a distal portion of the conveyor belt 302 along a shaping region 350 of the forming assembly 300 (FIG. 3C). The conveyor belt 302 includes a top or conveying portion 302a and a bottom portion 302b (FIG. 3C), and the forming belt 304 includes a top portion 302a and a bottom or forming portion 304b (FIG. 3C). As best shown in FIG. 3B, the forming assembly 300 also includes a first motor 312 coupled to the proximal conveying pulley 332a and a second motor 314 coupled to the proximal forming pulley 334a. As best shown in FIG. 3C, the conveyor belt 302 and the forming belt 304 are configured to rotate in the same direction. As such, the opposing portions of the conveyor and forming belts 302, 304—a distal portion of the conveying portion 302a, and the forming portion 304b—run in opposite directions (indicated by arrows B1 and B2 in FIG. 3C). Although both the conveyor belt 302 and the forming belt 304 are shown rotating clockwise in FIG. 3C, in other embodiments the belts 302, 304 can rotate counterclockwise.

Referring to FIG. 3C, the forming assembly 300 also includes a conveyor belt support 322 positioned between top and bottom portions 302a, 302b of the conveyor belt 302 within the shaping region 350. The conveyor belt support 322 has a support surface 322a positioned adjacent the top or conveying portion 302a of the conveyor belt 302. At least when not under the weight of the lump of dough L (or other forces associated with conveying the lump of dough L), the conveyor belt 302 is separated from the support surface 322a by a distance that decreases in a distal direction. As such, the support surface 322a angles upwardly in a distal direction such that the support surface 322a is positioned at an angle with respect to the conveying portion 302a of the conveyor belt 302. Accordingly, as the lump of dough L moves through the shaping region 350, the flexing of the conveyor belt 302 is limited by the support surface 322a.

The forming assembly 300 also includes a forming belt support 324 positioned between top and bottom portions 304a, 304b of the forming belt 304. The forming belt support 324 has a support surface 324a positioned adjacent and parallel to the bottom or forming portion 304b of the forming belt 304. In other embodiments, the support surface 324a can be positioned at an angle with respect to the forming portion 304b. At least when not engaging the lump of dough L, the forming belt 304 is separated from the support surface 324a by a distance that remains generally constant along the support surface 324a. Accordingly, as the lump of dough L moves through the shaping region 350, the flexing of the forming belt 304 is limited by the support surface 324a.

The conveyor belt 302 is positioned to automatically receive the succession of lumps of dough L discharged from the mixing assembly 200 and transport the same towards the forming belt 304 (and eventually, the oven 400). Because the lumps of dough exiting the mixing assembly 200 have irregular, globular shapes unfit for a baking pan, the forming assembly 300 shapes the lumps of dough into a shape that is more suitable for reception by a baking pan of the oven 400.

As best shown in FIG. 3C, a diameter of the proximal forming pulley 334a is larger than the diameter of the distal forming pulley 334b. As such a distance between opposing surfaces of the conveyor belt 302 and the forming belt 304 increases in a proximal to distal direction along the conveyor belt 302. In other embodiments, the proximal and distal forming pulleys 334a, 334b can have the same diameter but can be mounted at an angle such that the proximal forming pulley 334a is positioned closer to the conveying portion 302a of the conveyor belt 302. In either embodiment, the distance between the proximal portion of the forming belt 304 and the conveying portion 302a of the conveyor belt 302 is less than the average height of an incoming lump of dough L. As a result, the forming portion 304b of the forming belt 304 contacts and exerts pressure on the incoming lump of dough L. To accommodate the larger size of the dough L, the conveyor belt 302 flexes downwardly such that the lump of dough L also moves downwardly and a distal portion of the dough contacts a front face 322b of the conveyor belt support 322, thereby preventing at least a portion of the dough L from distal movement along the conveyor belt 302. Meanwhile, the forming belt 304 rotates at speed less than that of the conveyor belt 302 such that the forming portion 304b of the forming belt 304 forces a top portion of the dough L to move in a direction counter to the direction of movement of the conveyor belt 302. Accordingly, the height of the dough L begins to decrease in a distal to proximal direction along the dough L until a distal portion of the dough L has a height less than or equal to the perpendicular distance between the support surfaces 322a, 324a. At this point, the shorter, distal portion of the dough L is pulled distally past the face 322b, and the distal portion of the dough L is squeezed between the support surfaces 322a, 324a and forced to take the shape defined by the distance between the support surfaces 322a, 324a. The lump of dough L is pulled distally in this manner until the entire lump of dough L passes the support surfaces 322a, 324a in one contiguous piece. As such, the final height of the lump of dough L is generally equivalent to the distance between the distal end of the forming belt 304 and the conveyor belt 302.

Figure 3D:
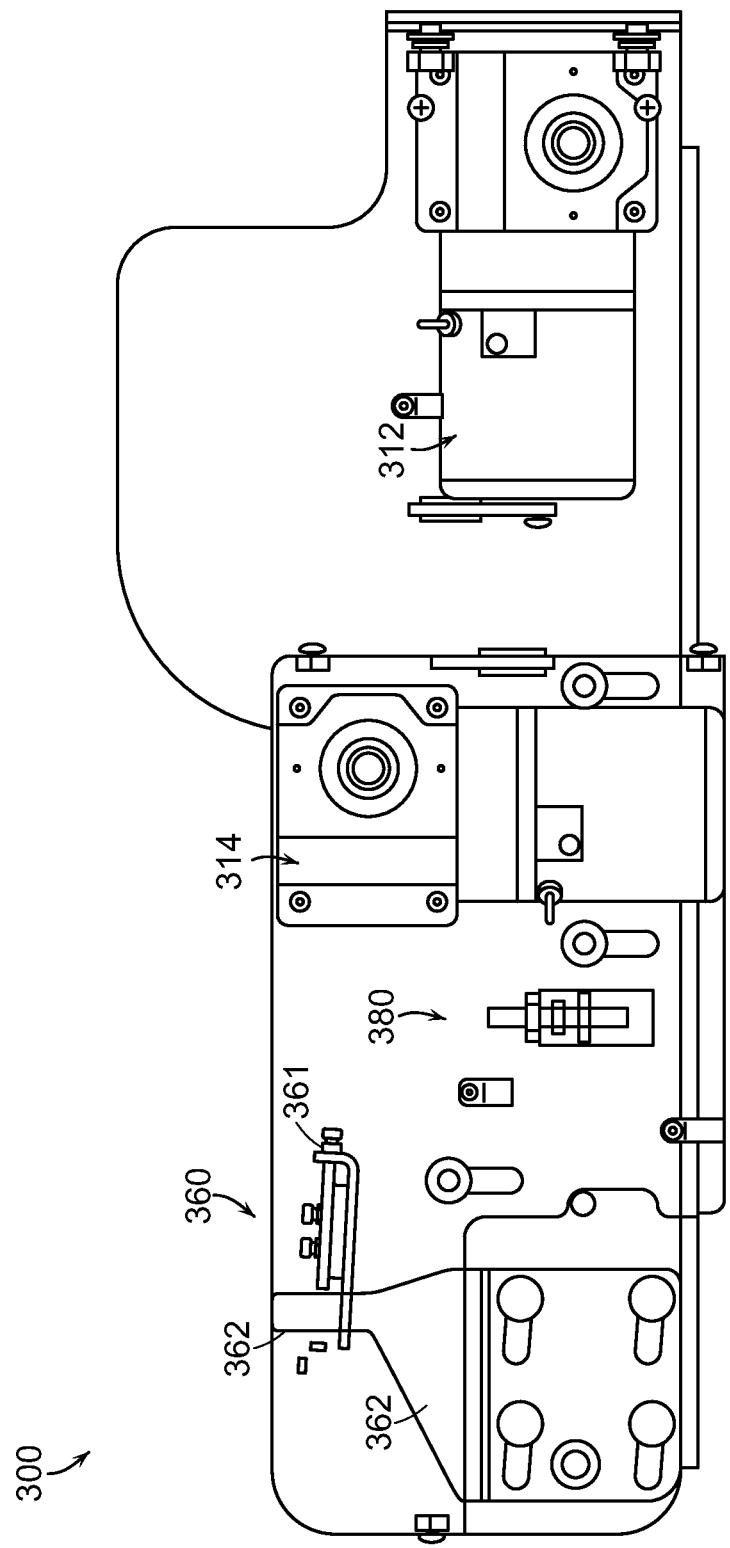
FIG. 3D is a right side view of the forming assembly shown in FIG. 3A.

One or more parameters of the forming assembly 300 can be automatically (via the controller 500) or manually adjusted to affect the shape of the discharged dough. For example, the support surfaces 322a, 324a can have any suitable shape or configuration to achieve a desired shape of dough. One or both of the support surfaces 322a, 324a can be generally flat, curved, include one or more depressions and or protrusions, etc. Additionally, as best illustrated in the rear view of the forming assembly 300 of FIG. 3D, the height and/or angle of the support 322 can be adjusted, for example, by turnbuckle screw 380. Also, the forming assembly 300 can include a tensioner 360 configured to adjust the tension in the conveyor belt 302 and/or the forming belt 304 by adjusting the distance between the corresponding distal and proximal pulleys. In the illustrated embodiment, the tensioner 360 is coupled to the distal conveying pulley 332b and/or the distal forming pulley 334b and is configured to adjust the position of the distal conveying and forming pulleys 332b, 334b to increase or decrease the distance between the distal conveying and forming pulleys 332b, 334b and their corresponding proximal pulleys 332a, 332b. The tensioner 360 can be manually adjusted via a screw 361 and/or the tensioner can be coupled to the controller 500 and can be configured for automatic adjustment. The forming system 300 can further include a height adjustment means 380 coupled to the conveyor belt 302 and/or the forming belt 304 and configured to move one or more of the conveyor belt 302 and/or the forming belt 304 to affect the distance between the opposing portions 302a, 304b. In a particular embodiment, the width of the forming system 300 can be manually or automatically adjusted to increase and/or decrease the width of the forming system. Moreover, in some embodiments the forming assembly 300 can include means for adjusting the position of the support surfaces 322a, 324a relative to one another. Additionally, the angular speed of the conveyor belt 302 and/or forming belt 304 can be adjusted. For example, in some embodiments, the first motor 312 and/or the second motor 314 can be coupled to the controller 500 such that a user may automatically adjust the angular speeds of the conveyor belt 302 and/or the forming belt 304 (respectively). The first motor 312 and/or the second motor 314 can be set to the same speeds or different speeds.

Figure 4A:
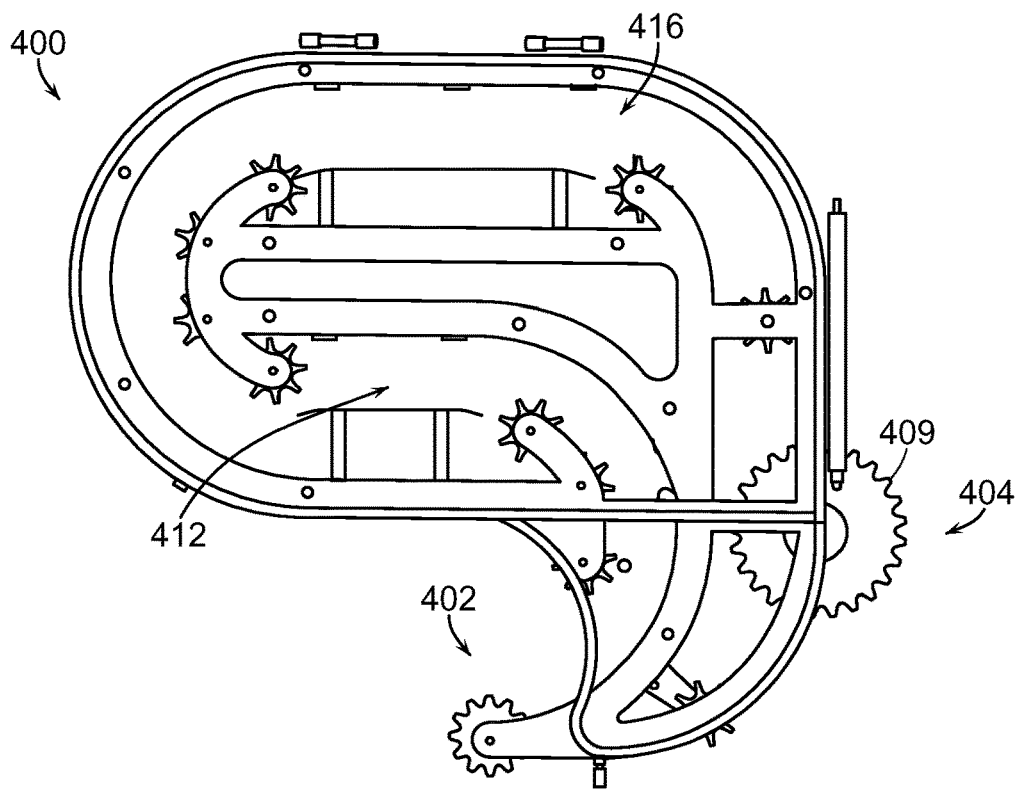
FIGS. 4A-4E are various views of an oven configured in accordance with one or more embodiments of the present technology.
Figure 4B:
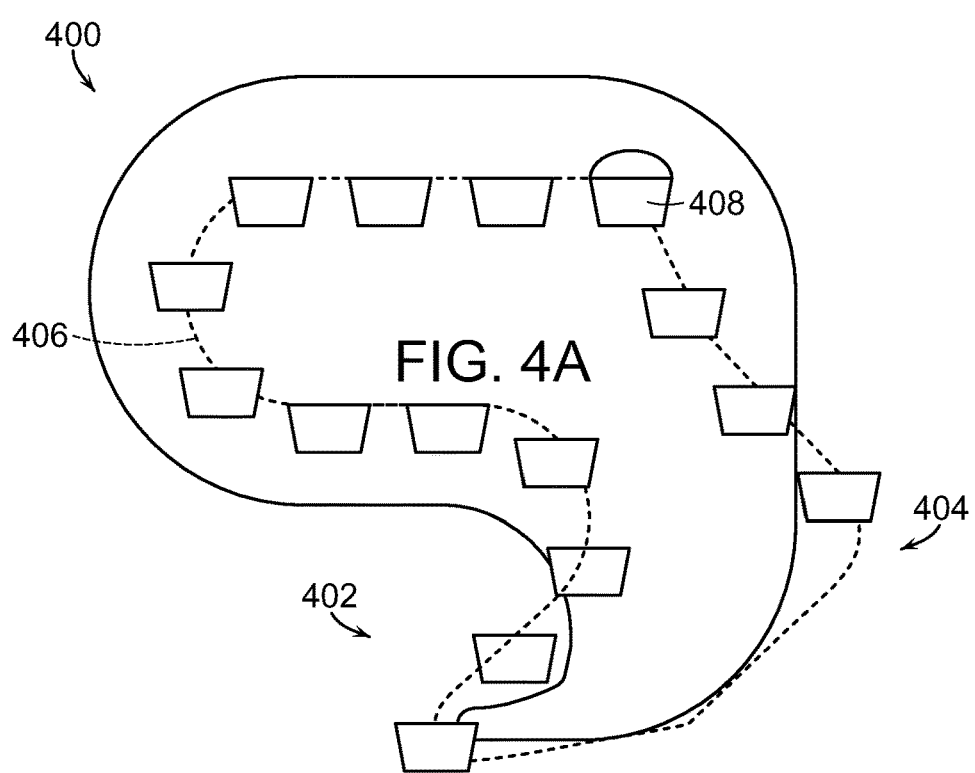
Figure 4C:
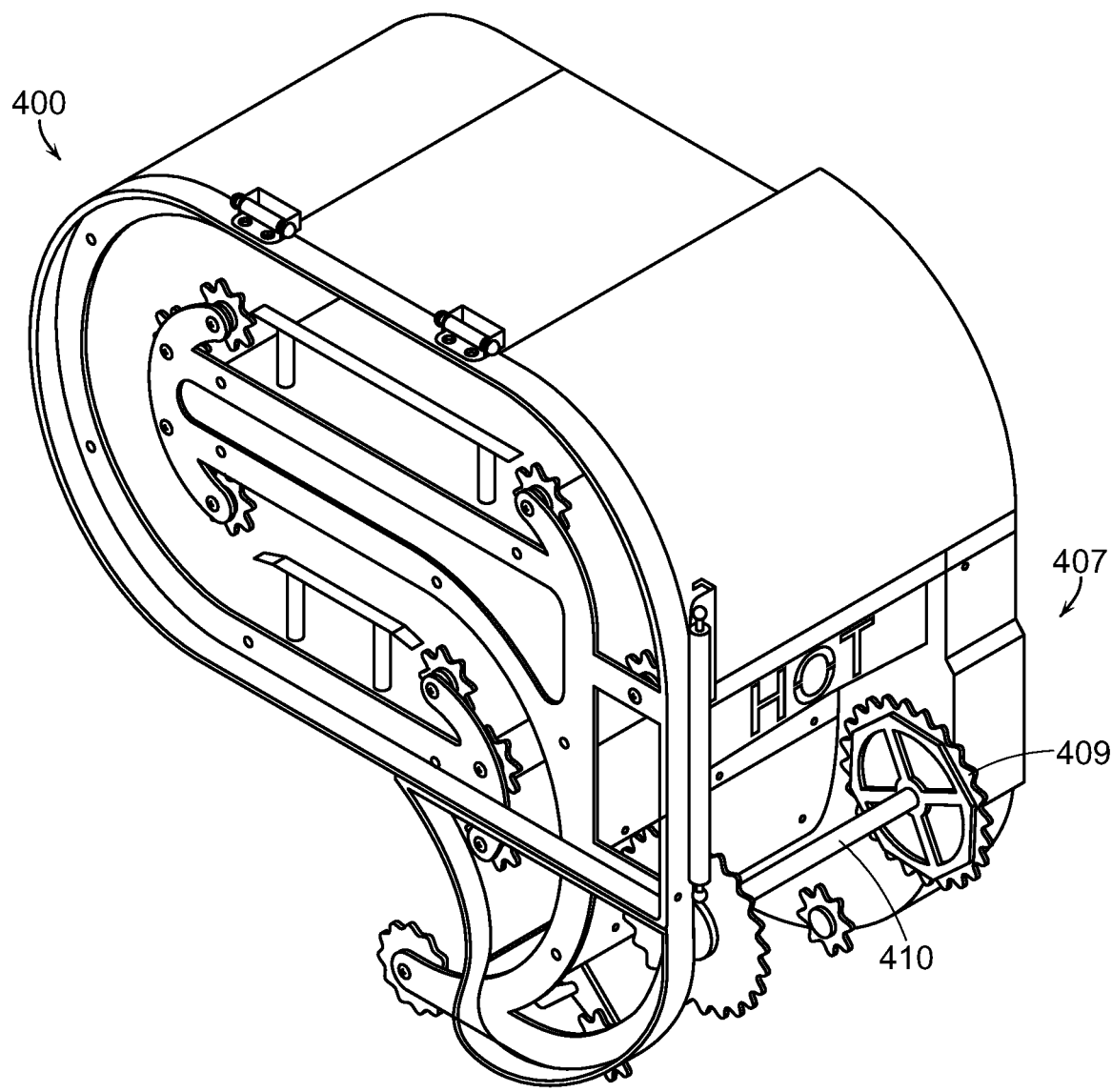
Figure 4D:
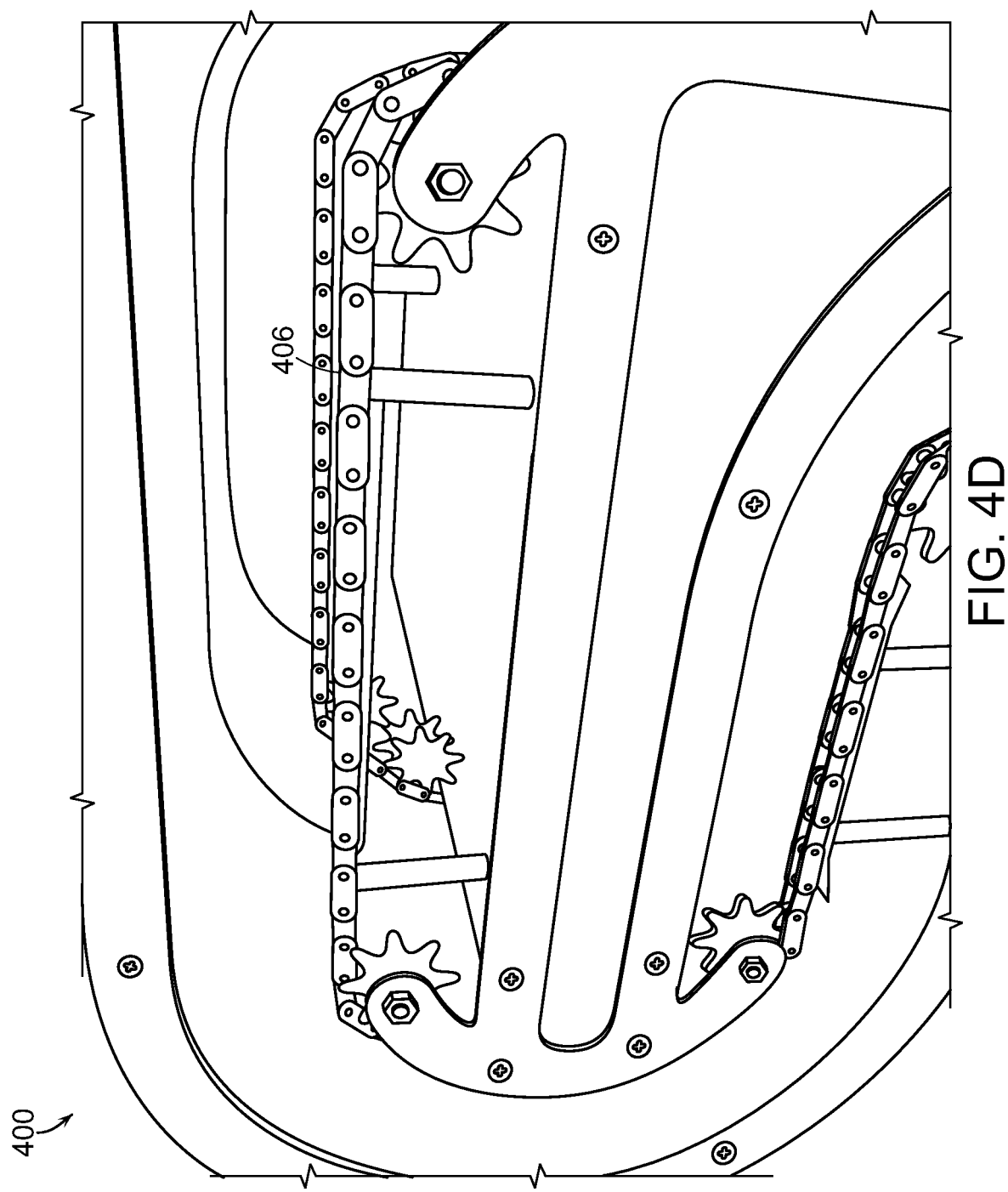
Figure 4E:
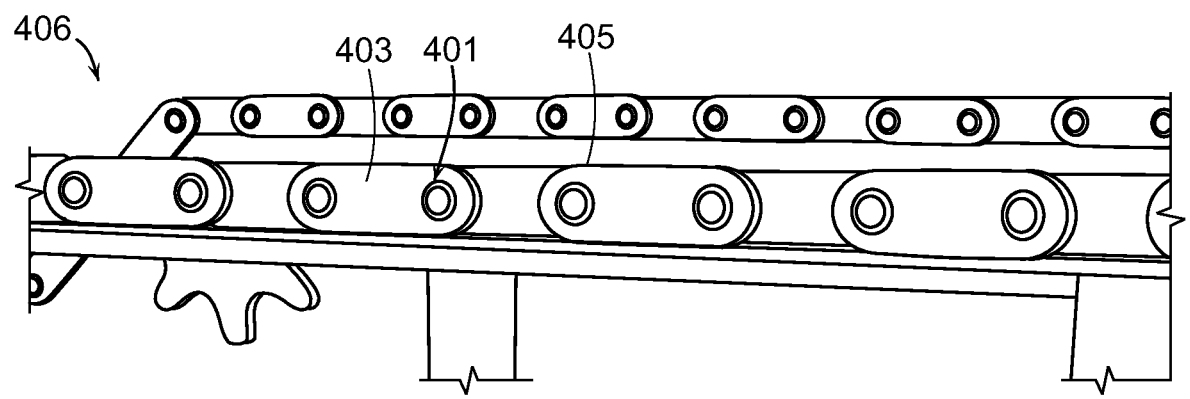

FIGS. 4A and 4C are isolated front and isometric views, respectively, of the oven 400 configured in accordance with one or more embodiments of the present technology. The conveyor 406 and other portions of the oven 400 have been removed in FIGS. 4A and 4C for ease of illustration. FIG. 4B is a schematic view of the oven 400 including the conveyor 406 and baking pans 408. Referring to FIGS. 4A-4C together, the oven 400 includes an oven inlet 402, an oven outlet 404, and an oven conveyor 406. The conveyor 406 is carried and directed by a series of sprockets and configured to transport baking pans 408 (e.g., non-stick baking pans) located at spaced intervals along the conveyor 406 through the oven 400 along a baking path from the oven inlet 402 to the oven outlet 404. In some embodiments, the conveyor 406 is configured to carry 10-30 baking pans 408 (e.g., 19 baking pans, 20 baking pans, etc.). A discharge sprocket 409 is positioned adjacent the oven outlet 404. The oven conveyor 406 of the illustrated embodiment is positioned with the baking pans 408 spaced along the conveyor 406 to receive the succession of lumps of dough from the forming system 300 into discrete ones of the baking pans 408. Accordingly, each baking pan 408 receives one shaped lump of dough. The oven conveyor 406 is driven by the one or more motor units 407 (FIG. 4B). In selected embodiments, a spray system (not shown) can coat the interior of the baking pans 408 before each baking pan 408 receives its shaped lump of dough. As best shown in FIGS. 4D and 4E, the oven conveyor 406 of the illustrated embodiment is a looped chain conveyor and includes a plurality of links 403 coupled at their respective ends by a roller 405 and a hollow pin 401. In other embodiments, the oven conveyor 406 can comprise other suitable conveying means.

In the embodiment shown in FIGS. 4A-4E, the oven 400 comprises an elongated horizontally oriented proofing chamber 412 and an elongated horizontally oriented baking chamber 416 positioned above the proofing chamber 412. In other embodiments, the proofing chamber 412 can and baking chamber 416 can have other arrangements (e.g., positioned within the same horizontal plane (e.g., side-by-side or end-to-end)). The proofing chamber 412 is configured to provide a temperature-controlled environment to expedite pre-baking processes (e.g., yeast fermentation), and the baking chamber 416 is configured to provide a temperature-controlled environment in which to bake the lumps of dough into a baked product (e.g., bread). For example, in selected embodiments the temperature maintained in proofing chamber 412 can be relatively low (e.g. approximately 95 degrees Fahrenheit/35 degrees Centigrade), while the temperature in the baking chamber 416 can be much higher (e.g., typical bread-baking temperatures)

Referring to FIG. 4C, near the end of the baking path and once the lumps of dough have transformed into a baked product (e.g., a loaf of bread), the baking pans 408 travel around the discharge sprocket 409 and the bottoms of the baking pans 408 are engaged and directed by a cylindrical shaft 410 or other type of engaging device held to and rotating with the sprocket 409. This forces the baking pans 408 to invert while traveling around the sprocket 409 and to thereby better allow baked bread to drop via the force of gravity from the respective baking pan 408. In certain embodiments, the cylindrical shaft 410 can be configured to cause the baking pans 408 to flex as the pans are inverted, thereby further urging the loaves to separate from the pans 408 as the pans 408 are inverted. In one embodiment, the shaft 410 can have a conical shape that assists in flexing the baking pans 408.

The oven 400 can be configured to complete a cycle (e.g., time between receiving the lump of dough from the forming system 300 and discharging the baked product at the oven outlet 404) in about 90 to about 130 minutes (e.g., less than about 110 minutes, less than about 120 minutes, etc.). Additionally, the oven 400 is configured to complete a baking cycle (e.g., time between receiving the lump of the dough from the forming system 300 and having a baked product) in about 50 minutes to about 110 minutes (e.g., less than about 80 minutes, less than about 90 minutes, less than about 100 minutes, etc.).

Figure 5A:
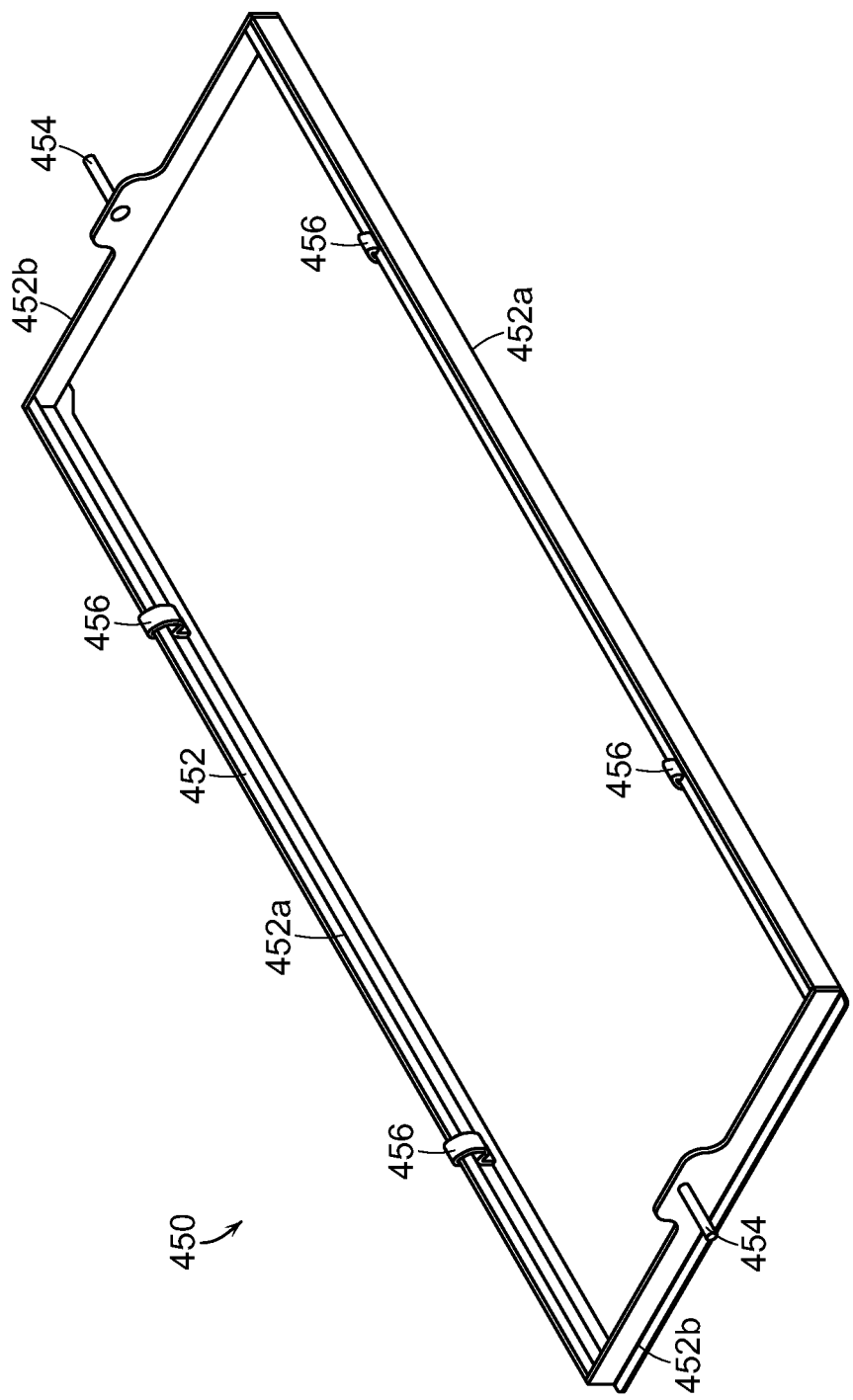
FIG. 5A is an isometric view of a support configured in accordance with one or more embodiments of the present technology.
Figure 5B:
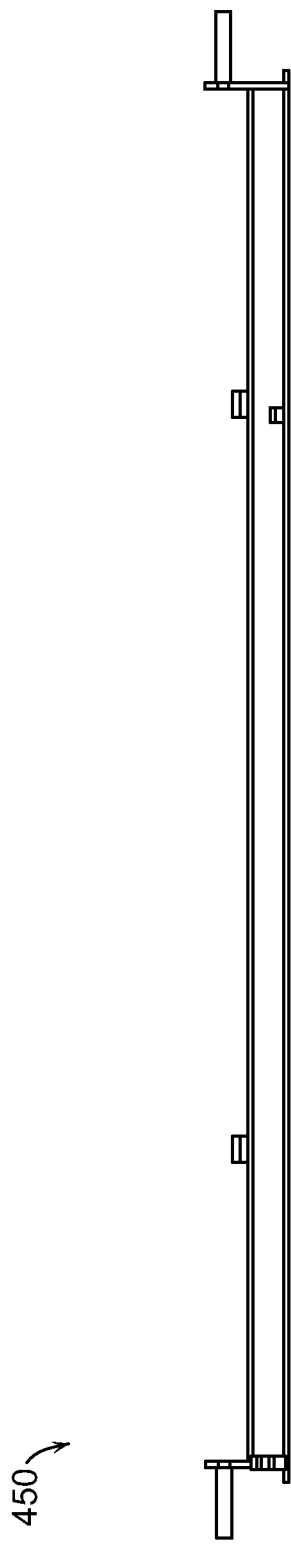
FIG. 5B is a side view of the support shown in FIG. 5A.
Figure 5C:
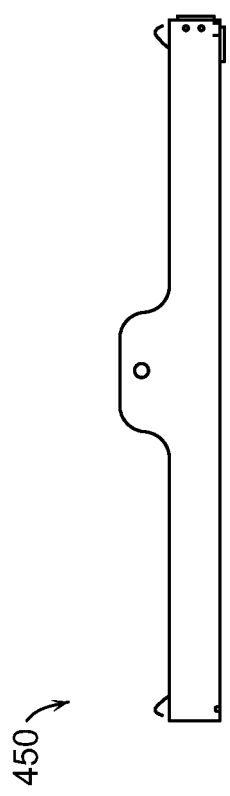
FIG. 5C is an end view of the support shown in FIG. 5A.

The oven 400 is configured to accommodate different sized baking carriers. For example, FIG. 5A is an isometric view of a support 450 configured for use with the oven 400 of the present technology, and FIGS. 5B and 5C are side and end views, respectively, of the support 450 shown in FIG. 5A. Referring to FIGS. 5A-5C together, the support 450 includes a rectangular frame 452 having side portions 452*a* and end portions 452*b* extending between the side portions 452*a*. The support 450 also includes couplers 454 coupled to the side portions 452*b*. The couplers 454 are configured to releasably couple the frame 452 to the conveyor 406 such that the frame extends lengthwise across opposing conveyors 406. The couplers 454 allow rotation of the frame 452 about the couplers 454 as the frame 452 moves through the baking path of the oven 400. In the illustrated embodiment, the couplers 454 are spring-loaded pins configured to be received by the hollow pins 401 (FIG. 4E) of the conveyor 406. In other embodiments, the couplers 454 can include other suitable mechanical coupling means.

The frame 452 is configured to receive and support many types and sizes of baking carriers, such as baking pans, baking sheets, etc. As used herein, "baking carrier" refers to any structure configured to hold and support an unbaked product during the baking process. In use, a user can place the selected baking carrier on or into the frame 452. In some embodiments, the support 450 also includes a one or more securing members 456 positioned around the frame 452. The securing members 456 are configured to engage one or more portions of the baking carrier 456 and secure the baking carrier 456 to the frame 452. In the illustrated embodiment, the securing members 456 are spring clips. In other embodiments, the securing members 456 include other suitable securing means. Although in the illustrated embodiment the frame 452 is rectangular, in other embodiments the frame 452 can have other shapes, sizes, and configurations (e.g., square, circular, polygonal, irregularly-shaped, etc.)

The support 450 of the present technology enables the system 10 to produce many types and sizes of baked product. For example, the support 452 of the present technology is configured to receive baking pans between about 3 inches and about 14 inches in length, and the oven 400 has a depth configured to accommodate baking carriers between 3 inches and 15 inches in length (e.g., the oven has a depth of at least 12 inches, at least 14 inches, etc.). Thus, the oven 400 is configured to run a first cycle with a first baking carrier having a first size, and a second cycle with a second baking carrier having a second size different than the first size. In other words, the oven 400 is configured to run a first production cycle with baking pans for baking standard-sized loafs of bread, and also run a second production cycle with a baking carrier (different than the baking pan of the first production cycle) for baking sub rolls, dinner rolls, artisan bread, breadsticks, cake, cupcakes, etc.

In some embodiments, the support 450 can be adjustable. For example, in some embodiments, the sides 452*a* and/or ends 452*b* of the support 450 can be adjusted to change the size of the opening 458 in the support 452. In a particular embodiment, the support 450 can include an one or more detachable struts (not shown) configured to extend from end-to-end or side-to-side. The detachable strut(s) can be slidable along the frame so as to the adjust the positioning of the strut(s).

III. ADDITIONAL FEATURES

The system 10 of the present technology can include additional features. For example, as shown in FIGS. 1A and 1B, the system 10 can optionally include an enclosure 32 (only a portion of which is shown in FIG. 1A; the enclosure 32 is removed in FIG. 1B for ease of illustration). The enclosure 32 is coupled to the frame 30 and surrounds the front 12, side 16, 18, and rear 14 portions of the system 10, thereby insulating and protecting the assemblies 11 from the surrounding environment, such as a busy retail outlet. The enclosure 32 includes an opening at a top portion that allows additional ventilation for the system 10. As best shown in FIG. 1A, a portion of the enclosure 32 is transparent, thereby providing visibility of the assemblies 11 to the user. Additionally, a front portion of the enclosure 32 is defined by two doors 33 that are moveable relative to remaining portion of the enclosure 32 and/or frame 30 and provide access to an interior portion of the enclosure 32.

It will be appreciated that the enclosure 32 can have other suitable configurations. For example, the enclosure 32 can cover more or less of the system 10 than that shown in FIG. 1A. For example, in some embodiments the enclosure 32 may cover only the side 16, 18 and rear 16 portions of the system 10, and in other embodiments, the enclosure 32 may cover the top 20, side 16, 18, front 12 and rear portions 14. Additionally, in some embodiments the enclosure 32 can be completely transparent or completely opaque. In a particular embodiment, the enclosure 32 has more or fewer than two doors and/or doors that are positioned at the side 16, 18, rear 16, top 20, and/or bottom 22 portions in place of or in addition to the front portion 12. In yet other embodiments, the system 10 does not include an enclosure 32.

In some embodiments, the system 10 can move (relative to the ground) independent of another moveable device (e.g., a forklift) and without the need for disassembly. For example, in the illustrated embodiment, the system 10 includes wheels 40 coupled to a bottom portion of the frame 30 (only two of the four visible in FIG. 1B). The wheels 40 are moveable between a retracted position (as shown in FIG. 1B) and an extended position (not shown). The system 10 can include a lifting device (not visible), such as a mechanical or hydraulic jack, coupled to the frame 30 and configured to lift the frame 30 (and the attached assemblies 11) off the ground such that the wheels 40 are allowed to extend downwardly from the frame 30 and support the weight of the system 10. Once in the extended position, the wheels 40 are free to rotate and move the system 10 in any direction. In other embodiments, the wheels 40 are not retractable but fixed in the extended position. In such embodiments, the wheels 40 and/or system 10 can include a locking device to prevent the system 10 from unwanted movement. In yet other embodiments, the system 10 does not include wheels and/or is not independently movable.

IV. SELECTED EMBODIMENTS OF ADDITIONAL SYSTEMS AND ASSEMBLIES

Figure 6A:
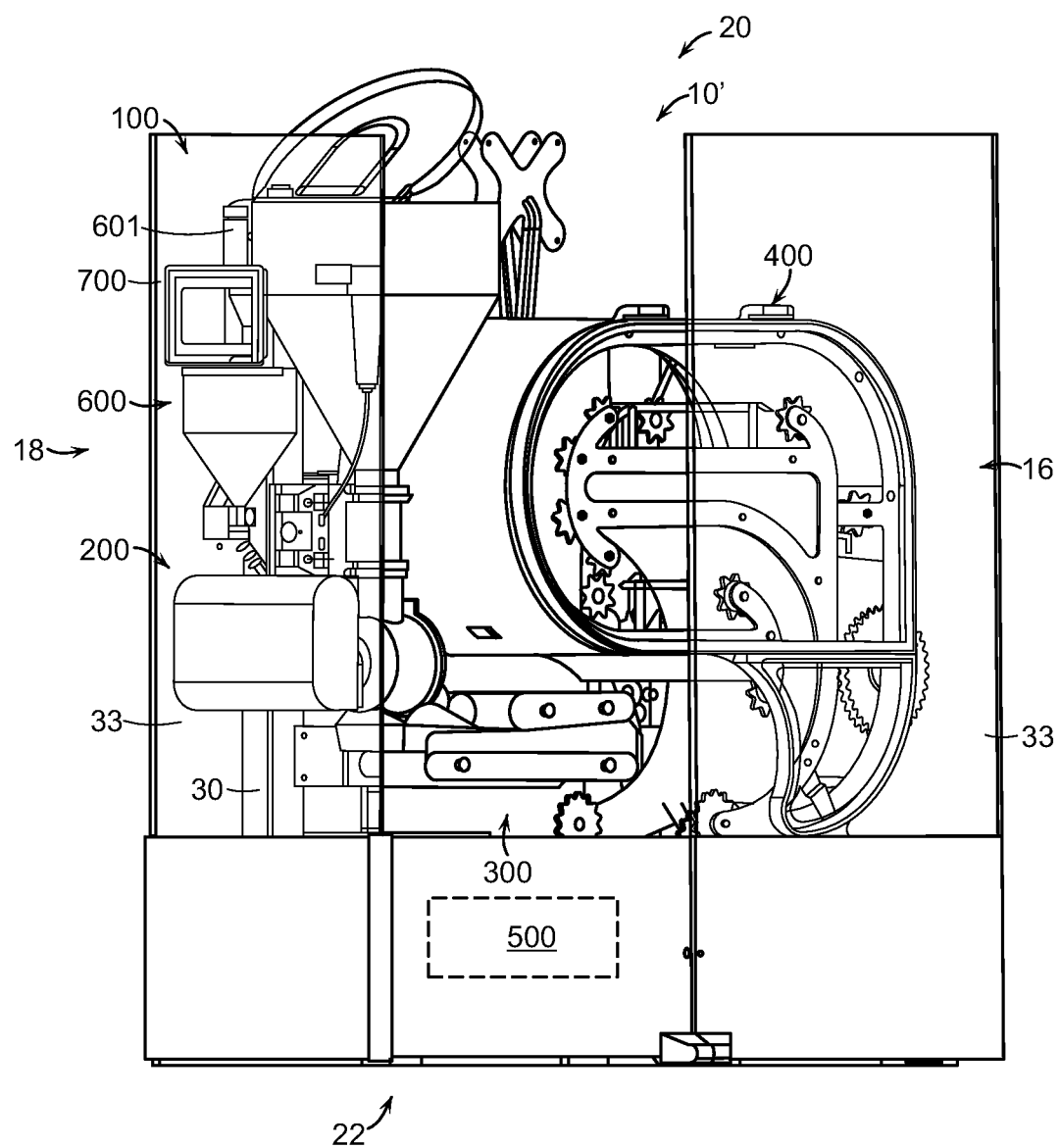
FIG. 6A is a front isometric view of an automated production system configured in accordance with another embodiment of the present technology. Various portions of the system have been removed or made transparent for ease of illustration.
Figure 6B:
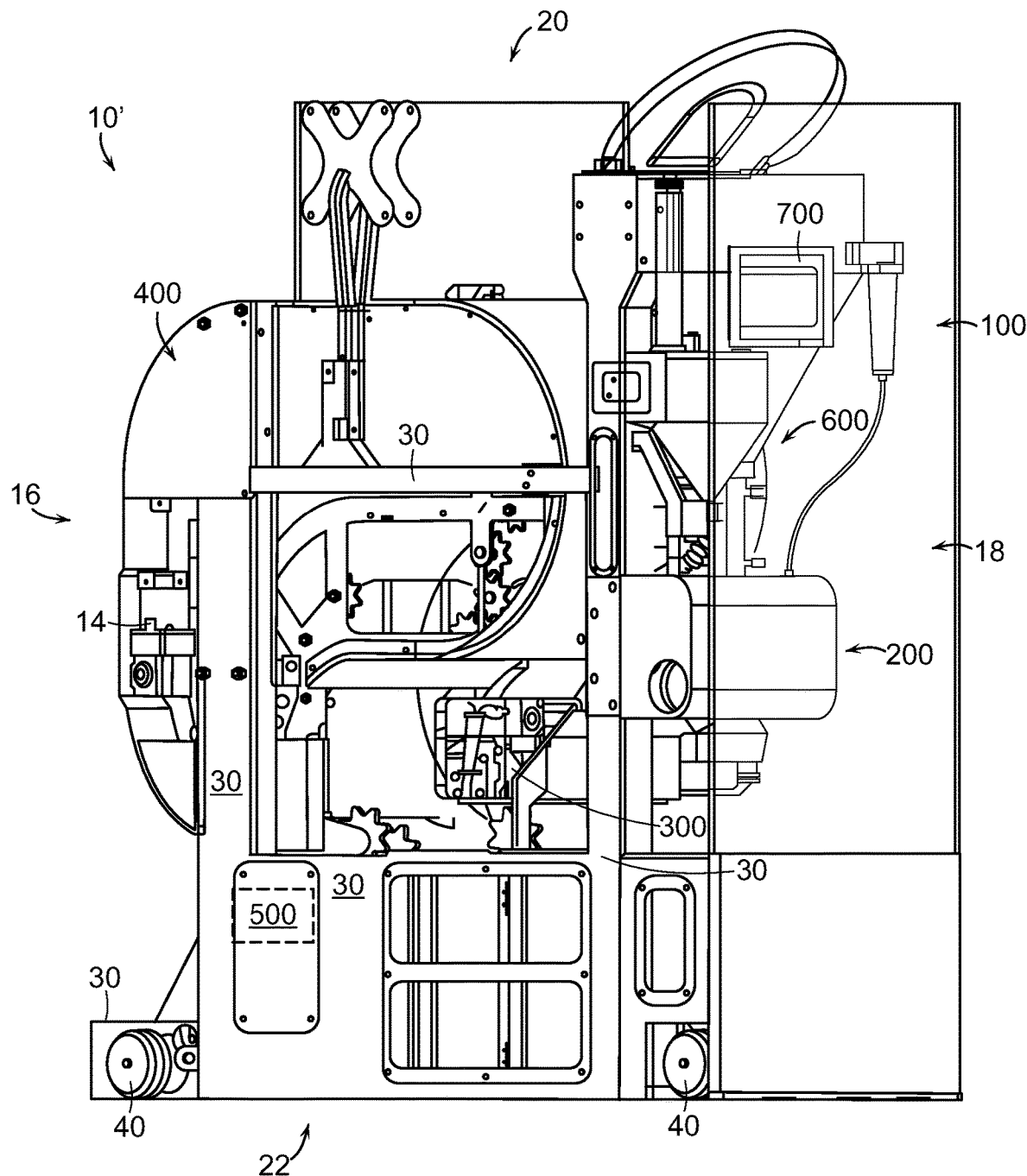
FIG. 6B is a rear isometric view of the automated production system shown in FIG. 6A.

FIGS. 6A and 6B are front and rear views of another embodiment of an automated production system 10' (also referred to herein as "system 10"), respectively, in accordance with the present technology. As identified below, portions of the system 10 may not be fully shown or made transparent in FIGS. 6A and 6B for purposes of illustration. The system 10' can be generally similar to the system 10 described above with respect to FIGS. 1A-5C. For example, the system 10' includes a priming assembly 100, a mixing assembly 200, a forming assembly 300, and an oven 400 (referred to collectively herein as "the assemblies 11"), and a controller 500 (shown schematically in FIGS. 6A and 6B) coupled to one or more of the assemblies 11 and/or one or more components of the assemblies 11. However, as described in greater detail below, the system 10' shown in FIGS. 6A and 6B includes an additional ingredients priming unit 600 (in addition to the dry ingredient priming unit 110 and the wet ingredients priming unit 150).

Figure 7:
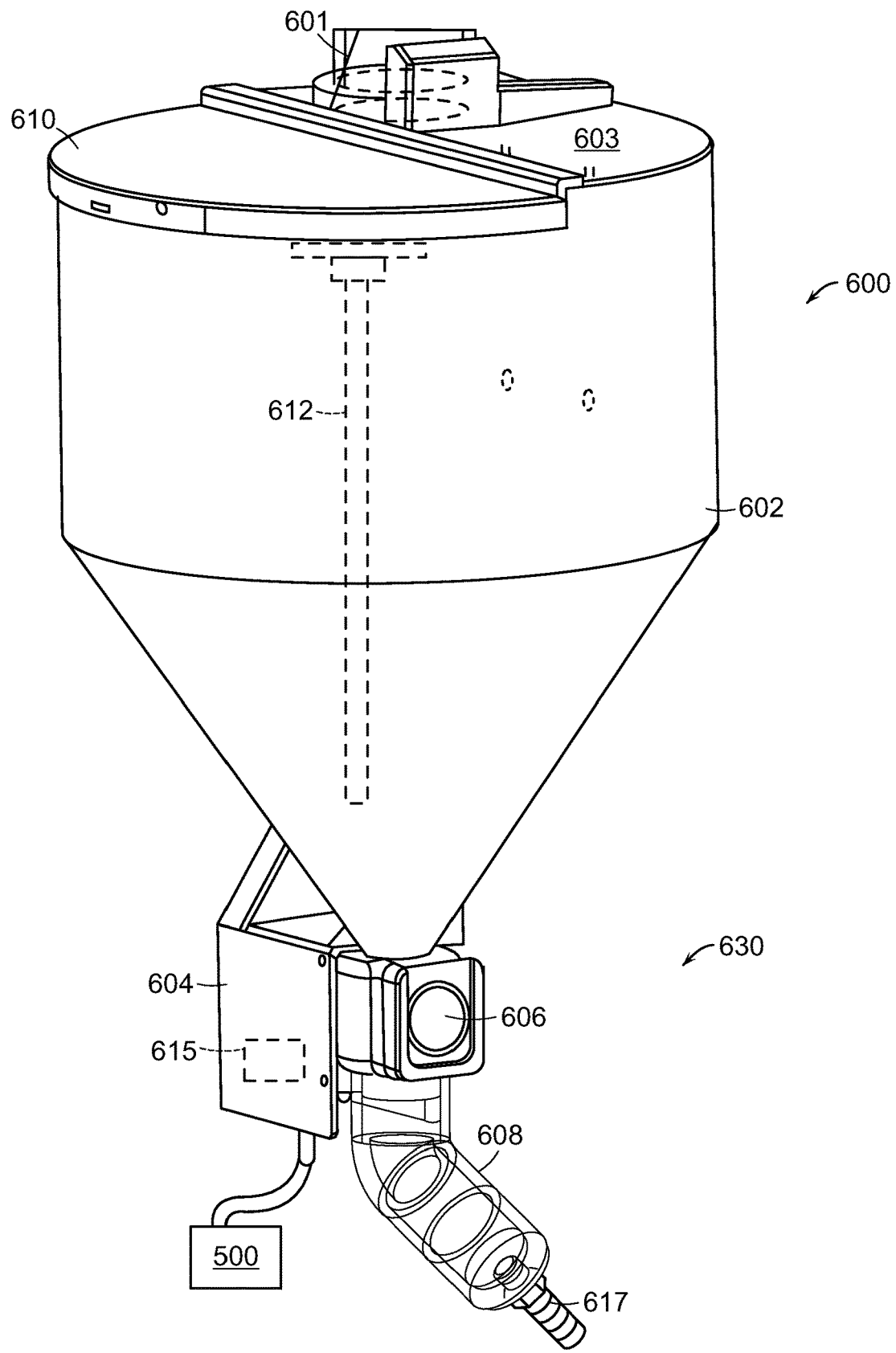
FIG. 7 is an isometric, isolated view of the ingredient dispenser shown in FIGS. 6A and 6B.

FIG. 7 is an isolated, front isometric view of the ingredients priming unit 600 shown in FIGS. 6A and 6B. The ingredients priming unit 600 of the illustrated embodiment (shown in FIGS. 6A, 6B, and 7) comprises a vertically-oriented vessel 602 coupled to a drive system 603 and an arm 612 (shown schematically in FIG. 7) that extends into an interior portion of the vessel 602. The vessel 602, for example, can have a similar shape as the hopper 112 shown in FIG. 2A, and the arm 612 can be similar to the screw 114 shown in FIG. 2A. The vessel 602 may be configured to hold the same or different volume of ingredient than the hopper 112. In some embodiments, the vessel can include more than one arm or may not include an arm.

In in the illustrated embodiment, the vessel 602 includes an opening (not visible in FIG. 7) at its top end and a cover 610 extending across the opening and movable between an open position and a closed position. When the cover 122 is in the open position, the opening 117 provides an inlet for receiving one or more wet ingredients or dry ingredients (e.g., flour, sugar, salt, yeast, spices, milk powder, and/or fruit powders) from one or more external sources. Although the cover 610 is shown having the partial-circle shape, in other embodiments the cover 610 can have other shapes or sizes (e.g., a full circle, non-circular, etc.). Likewise, in other embodiments the entire cover 610 can be movable.

In some embodiments, the system 10', priming assembly 100, and/or ingredients priming unit 600 include one or more ingredients sources (not shown in FIGS. 6A, 6B, and 7). For example, in some embodiments, the system 10' can include one or more containers configured to house one or more ingredients. The containers can be fixed to the frame 30 (or other component of the system 10') and/or operably coupled to the ingredients priming unit 600 via tubing (such as tubing 601) and/or one or more valves. In such embodiments, the controller 500 can be coupled to the valves to automatically control the timing, amount, and/or composition of ingredients dispensed into the vessel 602 from the container(s). In other embodiments, the dry ingredients can be manually dispensed into the vessel 602 from the external source(s).

The vessel 602 also includes an outlet 126 at its bottom end that discharges the dry ingredients from the vessel 602 into an intermediate assembly 630. The intermediate assembly 630 can include a metering element 606, an actuator 604 (such as a rotary motor) coupled to the metering element 606 and the controller 500, an optional pressure source 615 (shown schematically in FIG. 7), and tubing 608. The metering element 606 is configured to be selectively fluidly coupled to the outlet of the vessel 602 to receive ingredients from the vessel 602. The metering element 606 is configured to receive only a predetermined volume or weight of the ingredients contained in the vessel 602 and transfer the predetermined volume to the tubing 608.

Figure 8:
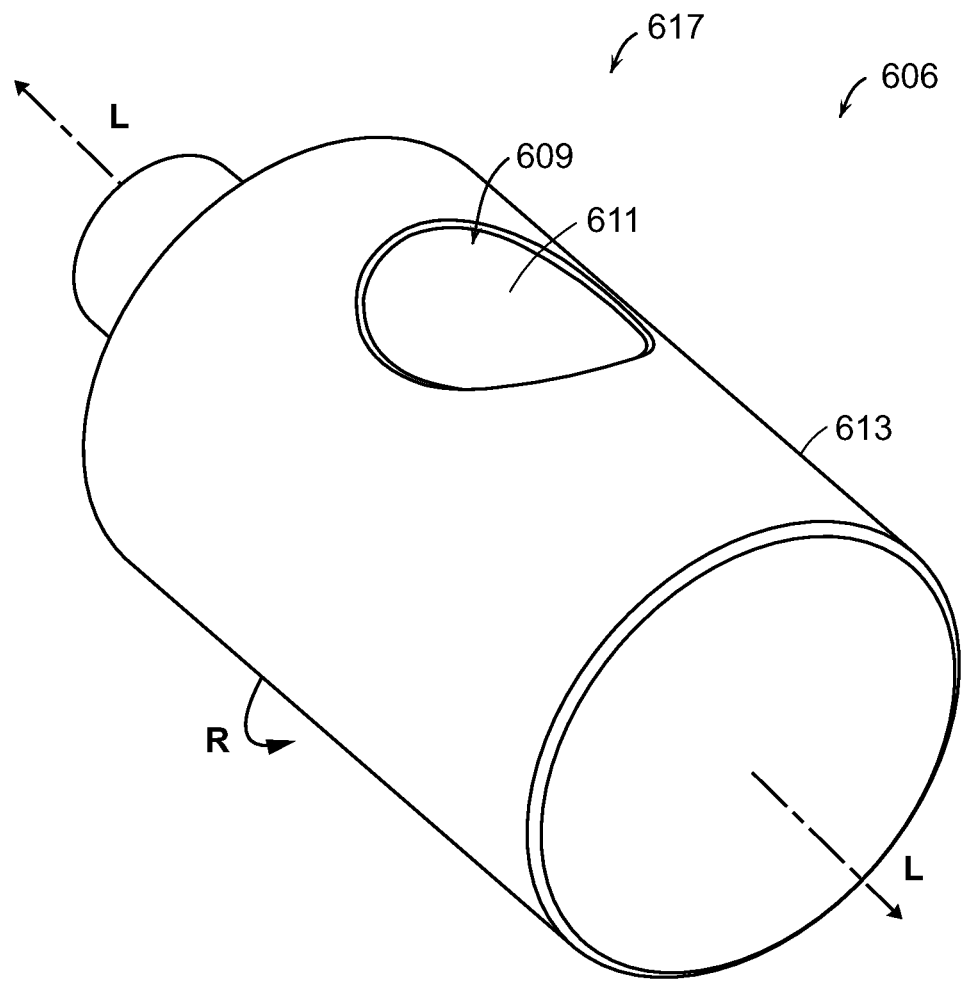
FIG. 8 is an enlarged, isometric, isolated view of a portion of the ingredient dispenser shown in FIG. 7.

FIG. 8 is an enlarged, isolated, isometric view of the metering element 606 shown in FIG. 7. As shown in FIG. 8, the metering element includes a generally cylindrical body 613 having a longitudinal axis L and a receiving portion 617 at its outer surface. The receiving portion 617 may include an opening 609 and a recessed surface 611 along the body 613. As shown in FIG. 8, the recessed surface 611 can have a generally curved shape. In other embodiments, the surface 611 and/or portions of the surface 611 can have other suitable geometries (e.g., linear regions, etc.). The receiving portion 617 is configured to receive a predetermined volume of ingredients from the vessel 602 (e.g., 1 gram of yeast, etc.). The metering element 606 is configured to be coupled to the actuator 604. When activated by the actuator 604, the metering element 606 rotates about its longitudinal axis L, thereby rotating the receiving portion 617 from its initial position to a circumferentially opposite position along the body 613. The controller 500 may be coupled to the actuator 604 (wirelessly or through a wired connection) and controls the timing of rotation of the metering element 606.

In operation, the receiving portion 617 and/or opening 609 of the metering element 606 aligns with the outlet of the vessel 602 and receives a predetermined volume of ingredients from the vessel 602. The actuator 604 then rotates the metering element 606 about its longitudinal axis to transfer the metered ingredients to the tubing 608. The actuator 604 and/or controller 500 may include a counter that counts the number of turns of the metering element 604, thereby controlling the amount of ingredients transferred to the tubing 608. After a desired amount of ingredients is transferred to the tubing 608, the pressure source 615 may be activated (manually or by the controller 500) to force the ingredients through the tubing outlet to the intermediate chamber 140 or mixing assembly 200. The pressure source 615, for example, may be configured to generate a burst of air within the tubing 608. The tubing outlet may optionally be fluidly coupled to a nozzle 617 which is then fluidly coupled to the intermediate chamber 140 or mixing assembly 200.

The ingredients priming unit 600 may be advantageous for controlling the ingredients on a loaf-by-loaf basis. For example, for bread with extra rise, the priming unit 600 may deliver more yeast to the mixture (e.g., via more rotations of the metering element 606). For bread with less rise, the priming unit 600 may deliver less yeast to the mixture (e.g., via less rotations of the metering element 606).

V. CONCLUSION

In other embodiments, the system 10 can have other arrangements. For example, in other embodiments, the system 10 can include more or fewer components. For instance, while the present embodiment describes and illustrates a system with a single production line, it will be readily understood by those skilled in the art that the system 10 can include more than two production lines. In still other embodiments, the system 10 can be used to produce other food or non-food products. For example, in selected embodiments the system 10 can be configured to produce cakes. Generally cakes do not require kneading, shaping, or proofing. Accordingly, in these selected embodiments the mixer assembly can be configured to mix a slurry or mixture of dry ingredients with a liquid and can include a downwardly facing opening to deposit the slurry directly into a baking pan that carries cake mixture through the baking chamber of the oven.

From the foregoing, it will be appreciated that specific embodiments of the present technology have been described herein for purposes of illustration, but that various modifications may be made without deviating from the spirit and scope of the invention. For example, aspects of the present technology described in the context of particular embodiments may be combined or eliminated in other embodiments. Although advantages associated with certain embodiments of the present technology have been described in the context of those embodiments, other embodiments may also exhibit such advantages. Additionally, none of the foregoing embodiments need necessarily exhibit such advantages to fall within the scope of the invention. Accordingly, the present technology is not limited except as by the appended claims.

We claim:
1. An automated system for the continuous production of baked product, comprising:
 a priming assembly comprising:
  a first dry ingredients priming unit comprising:
   a vertically-oriented hopper having a conical sidewall, a hopper inlet for receiving a first dry ingredient, a hopper outlet for discharging the first dry ingredient, and a central longitudinal axis; and
   a screw positioned within an interior region of the hopper, wherein the screw extends along the central longitudinal axis of the hopper and is configured to rotate about its own central longitudinal axis; and
  a second dry ingredients priming unit configured to receive and hold a second dry ingredient, the second dry ingredients priming unit comprising a vertically-oriented vessel having an opening at its top end and an outlet at its bottom end configured to discharge the second dry ingredient from the vessel; and
  a wet ingredients priming unit including a liquid reservoir and an outlet for discharging a metered amount of wet ingredients from the reservoir;
 a mixing chamber fluidly coupled to the priming assembly and configured to separately receive the first and second dry ingredients from the first and second dry ingredients priming units and the wet ingredients from the wet ingredients priming unit and mix the wet ingredients and the first and second dry ingredients to form a lump of dough, wherein the lump of dough is sized to form an individual baked product;
 a forming assembly configured to receive the lump of dough from the mixing chamber and mold the lump of dough into a predetermined shape, wherein the forming assembly comprises:
  a conveyor belt with a top portion and a bottom portion,
  a forming belt with a top portion and a bottom portion, wherein the forming belt is positioned above the conveyor belt such that at least a portion of the forming belt is aligned with at least a portion of the conveyor belt,
  a conveyor belt support positioned between the top portion and the bottom portion of the conveyor belt, wherein the conveyor belt support is configured to limit flexing of the conveyor belt as the lump of dough moves along the conveyor belt,
  a forming belt support positioned between the top portion and the bottom portion of the forming belt, wherein the forming belt support limits flexing of the forming belt as the lump of dough moves along the forming belt, and
 an oven configured to receive the shaped lump of dough from the forming assembly and apply heat to transform the shaped lump of dough into a baked product; and
 a controller coupled to the priming assembly and having memory and processing circuitry, wherein the controller is configured, for each individual baked product, to:

adjust the timing and/or amount of the first dry ingredient delivered from the first dry ingredients priming unit to the mixing chamber; and adjust the timing and/or amount of the second ingredient delivered from the second dry ingredients priming unit to the mixing chamber.

2. The system of claim 1 wherein the screw is configured to rotate in a first direction to move the first or second dry ingredients away from the hopper outlet and a second direction opposite of the first direction to move dry ingredients toward the hopper outlet.

3. The system of claim 1 wherein the screw includes an elongated shaft and a ribbon wrapped in a helical configuration along at least a portion of the elongated shaft.

4. The system of claim 3 wherein the hopper includes a conical portion and a cylindrical portion extending downwardly from a tapered end of the conical portion, wherein the screw extends downwardly into the cylindrical portion such that at least one full turn of the helical ribbon resides within the cylindrical portion.

5. The system of claim 1 wherein the screw is a first screw and the priming assembly further comprises a second screw positioned within the interior region of the hopper, the second screw having a central longitudinal axis, wherein at least a portion of the second screw is adjacent and extends parallel to the conical sidewall and is configured to simultaneously rotate about the central longitudinal axis of the hopper and its own central longitudinal axis.

6. The system of claim 5, further comprising a drive system coupled to the first screw and the second screw, wherein, when the drive system is activated, the drive system causes simultaneous rotation of the first screw about its own axis and the second screw about its own central longitudinal axis and/or the central longitudinal axis of the first screw.

7. The system of claim 1, further comprising a metering element coupled to the vessel having:

a first end with a first opening and a second end with a second opening, a first cover having an open position in which the first cover is fluidly coupled to the vessel outlet and a closed position, and a second cover having an open position in which the second cover is fluidly coupled to the mixing chamber and a closed position.

8. The system of claim 7 wherein the metering element is configured to receive only a predetermined volume or weight of the second ingredient.

9. The system of claim 1 wherein the second dry ingredients priming unit is comprised of a drive coupled to a first arm, and the first arm extends into the vessel.

10. The system of claim 1 wherein the priming assembly is configured to receive ingredients from multiple chambers.

11. The system of claim 10 wherein the chambers are on a rotating table and the desired chamber can be manually or automatically rotated into alignment with the hopper outlet and the mixing chamber inlet.

12. The system of claim 10 wherein the chambers are configured to hold a different volume.

13. The system of claim 10 wherein the chambers are on a rotating table and the desired chamber can be manually or automatically rotated into alignment with the vessel outlet and the mixing chamber inlet.

14. The system of claim 1 wherein the conveyor belt support comprises a support surface adjacent the top portion of the conveyor belt and, at least when not under the weight of the lump of dough, is angled with respect to the top portion of the conveyor belt.

15. The system of claim 1 wherein the forming belt support comprises a support surface adjacent the bottom portion of the forming belt and, at least when not engaging the lump of dough, is substantially parallel to the bottom portion of the forming belt.

* * * * *